US 9,689,702 B2

(12) United States Patent
Habib et al.

(10) Patent No.: US 9,689,702 B2
(45) Date of Patent: Jun. 27, 2017

(54) NAVIGATION SYSTEM WITH MAP MECHANISM AND METHOD OF OPERATION THEREOF

(71) Applicant: Telenav, Inc., Sunnyvale, CA (US)

(72) Inventors: Md Ahsan Habib, Santa Clara, CA (US); Xun Liu, Shanghai (CN); Shanjun Chen, Mountain View, CA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 14/610,894

(22) Filed: Jan. 30, 2015

(65) Prior Publication Data

US 2016/0223355 A1  Aug. 4, 2016

(51) Int. Cl.
*G01C 21/00* (2006.01)
*G01C 21/36* (2006.01)
*G01C 21/34* (2006.01)

(52) U.S. Cl.
CPC ..... *G01C 21/3667* (2013.01); *G01C 21/3492* (2013.01)

(58) Field of Classification Search
CPC ............. G01C 21/3667; G01C 21/3492
See application file for complete search history.

(56) References Cited

U.S. PATENT DOCUMENTS

| 2010/0198442 | A1* | 8/2010 | Appelman | G05D 1/0223 701/25 |
| 2010/0268460 | A1* | 10/2010 | Wan | G01C 21/3461 701/414 |
| 2013/0147846 | A1* | 6/2013 | Kalai | G06T 1/60 345/660 |
| 2013/0169685 | A1 | 7/2013 | Lynch | |
| 2013/0204528 | A1* | 8/2013 | Okude | G08G 1/096822 701/533 |
| 2013/0325326 | A1* | 12/2013 | Blumenberg | G01C 21/32 701/428 |

FOREIGN PATENT DOCUMENTS

EP        2613303 A1    9/2011

* cited by examiner

*Primary Examiner* — Adam Alharbi
(74) *Attorney, Agent, or Firm* — IP Investment Law Group

(57) ABSTRACT

A method of operation of a navigation system includes: generating a potential route based on a navigation information, a status information, or a combination thereof; determining an update priority based on comparing a first map and the potential route on a second map with a control unit for identifying a discrepancy between the first map and the second map; and updating the first map based on the update priority for displaying on a device.

20 Claims, 6 Drawing Sheets

NAVIGATION SYSTEM WITH MAP MECHANISM AND METHOD OF OPERATION THEREOF

TECHNICAL FIELD

The present invention relates generally to a navigation system, and more particularly to a system with map mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without map mechanism to update the map relevant to the user has become a paramount concern for the consumer. The inability decreases the benefit of using the tool.

Thus, a need still remains for a navigation system with map mechanism to optimally update the map for the user. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a potential route based on a navigation information, a status information, or a combination thereof; determining an update priority based on comparing a first map and the potential route on a second map with a control unit for identifying a discrepancy between the first map and the second map; and updating the first map based on the update priority for displaying on a device.

The present invention provides a navigation system, including: a control unit for; generating a potential route based on a navigation information, a status information, or a combination thereof, determining an update priority based on comparing a first map and the potential route on a second map for identifying a discrepancy between the first map and the second map, and updating the first map based on the update priority, and a communication interface for communicating the first map for displaying on a device.

The present invention provides a non-transitory computer readable medium including instructions for execution, the instructions comprising: generating a potential route based on a navigation information, a status information, or a combination thereof; determining an update priority based on comparing a first map and the potential route on a second map for identifying a discrepancy between the first map and the second map; and updating the first map based on the update priority for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
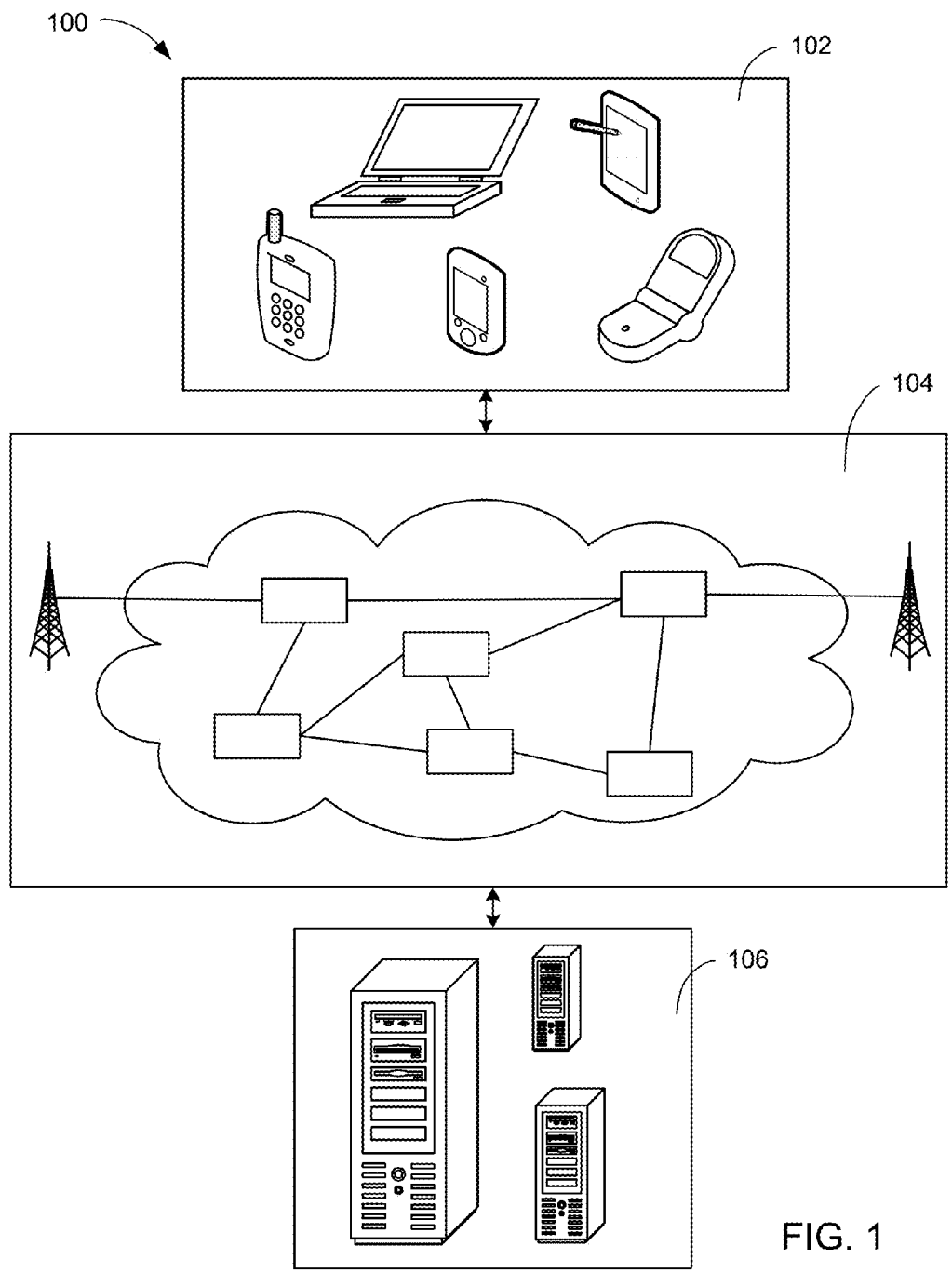
FIG. 1 is a navigation system with map mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown a navigation system 100 with map mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
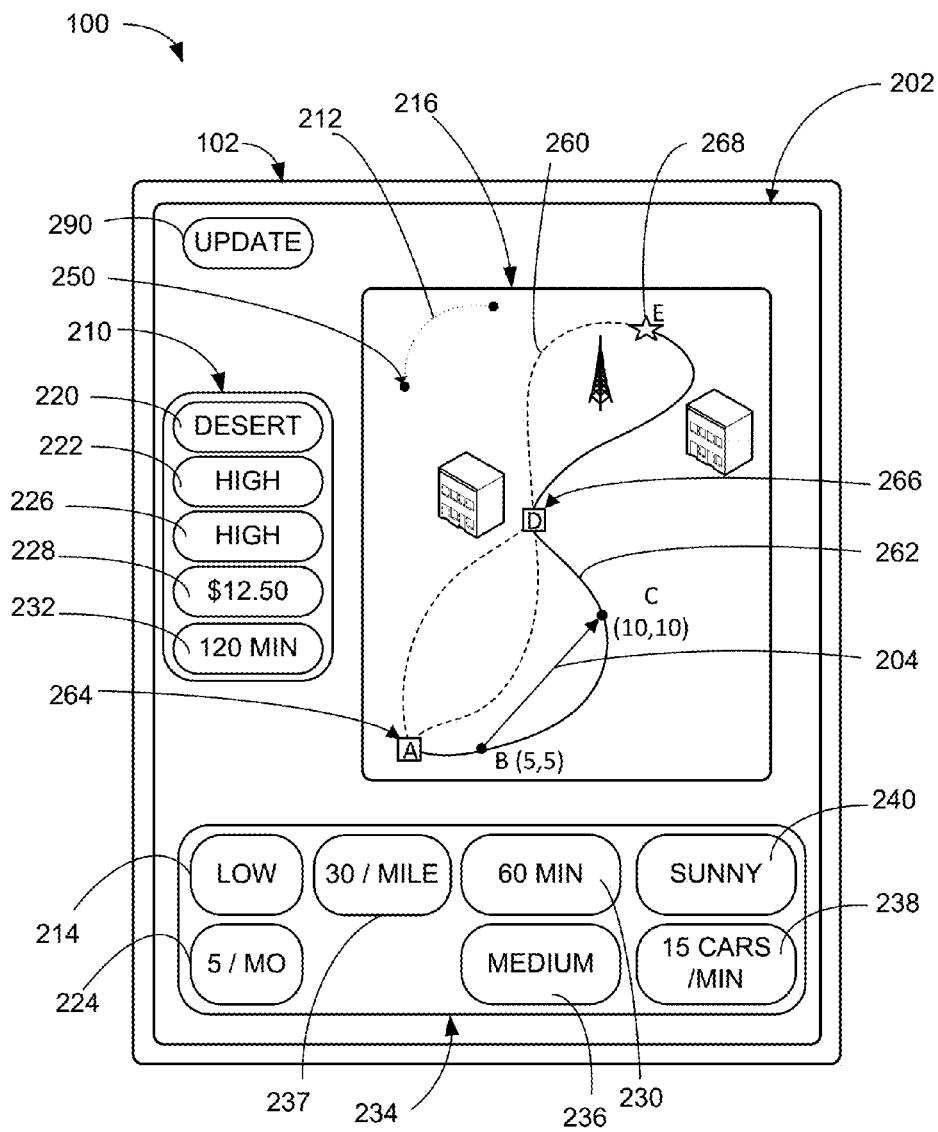
FIG. 2 is an example of a navigation information of the navigation system.

Referring now to FIG. 2, there is shown an example of a navigation information 202 of the navigation system 100. For clarity and brevity, the embodiment of the present invention will be described with the first device 102 delivering the result generated by the navigation system 100. However, the first device 102 and the second device 106 of FIG. 1 can be discussed interchangeably.

The navigation information 202 is defined as information collected prior to the commencement of the navigation guidance by the navigation system 100. For example, the navigation information 202 can include a preference 210. The preference 210 is defined as a metric used for determining the path 212 reflecting the inclination of the user for travel. For example, the preference 210 can be a user's predilection. For further example, the navigation system 100 can consider the preference 210 to select a path 212. The path 212 is defined as a passage or a representation of the passage connecting an instance of a geographic location to another instance of the geographic location. Other real world situation can be represented in a map information 216.

The map information 216 is defined as a symbolic representation of an element, a restriction, or a combination thereof of the real world. For example, the map information 216 can include the path 212, a traffic sign, a building information, a speed limit, other driving related information, or a combination thereof.

The navigation information 202 can include multiple instances of the preference 210 including a scenic view 220, a safety level 222, a travel cost level 226, a travel time 230, or a combination thereof. The scenic view 220 is defined as an appearance of the environment. For example, the scenic view 220 can represent a desert, a rainforest, a cityscape, a grassland, a plateau, or a combination thereof along the path 212.

The safety level 222 is defined as a preference 210 in selecting the path 212 based on the likelihood of being involved in an accident. The safety level 222 can be represented in various ways. For example safety level 222 can be represented in a numerical value of accidents per month along the path 212. In a specific example, a high value for the safety level 222 can represent an unlikelihood of being involved in an accident where the safety level 222 is below a safety threshold 224. In another example, a medium value for the safety level 222 can represent the inclination to select the path 212 based on the moderate likelihood of being involved in the accident where the safety level 222 is at the safety threshold 224. Alternatively, a low value for the safety level 222 can represent the likelihood of being involved in the accident where the safety level 222 is above the safety threshold 224.

The safety threshold 224 is defined as a metric used for comparison to determine the value of the safety level 222. The numerical representation of the safety threshold 224 can be represented as a number of instances of accident per month along the path 212. For example, the safety threshold 224 can represent 5 accidents per month along a particular instance of the path 212.

The travel cost level 226 is defined as a preference 210 in the amount of expenditure to be requested to pay for a transportation expense 228 for the travel from one instance of a geographic location to another instance of the geographic location. The travel cost level 226 can be represented in various levels.

For example, the low value for the travel cost level 226 can represent the preference 210 of traveling through the path 212 requiring least amount of transportation expense 228 compared to other instances of the path 212. Alternatively, the high value for the travel cost level 226 can represent the preference 210 of disregarding the transportation expense 228 in selection of the path 212.

The transportation expense 228 is defined as a monetary expenditure to be obligated to pay for the travel of the path 212. For example, the transportation expense 228 can include a fuel cost, a toll, or a combination thereof. The transportation expense 228, such as a toll, can be required when traveling through a feature on the path 212. The feature on the path 212 can include a bridge, a highway, a tunnel, or a combination thereof. The transportation expense 228 for an instance of the path 212 can be an aggregated cost required to travel the path 212 including the fuel cost, the toll, or a combination thereof. The transportation expense 228 can be represented in monetary units, such as dollar, euro, pound, yen, rubel, peso, renminbi, or combination thereof.

The navigation system 100 can consider a travel time level 214 for selecting the instance of the path 212 based on the travel time 230. The travel time level 214 is defined as a representation of the time to travel the instance of the path 212 in comparison to another instance of the path 212. The travel time level 214 can be represented in various ways, such as "high" or "low" value. The high value for the travel time level 214 can represent inclination to travel the path 212 requiring lesser amount of the travel time 230 compared to the instance of the path 212 requiring greater amount of the travel time 230.

The travel time 230 is defined as duration of time for navigating through the path 212. For example, the travel time 230 can be represented in an international atomic time, including days, hours, minutes, seconds, or a combination thereof.

A projected drive time 232 is defined as duration of time to navigate the path 212 incorporating a live information 234. The live information 234 is defined as an information representing a changing condition of the path 212 affecting the travelable speed. The live information 234 can include a factor, such as a traffic factor 236, a weather factor 240, or a combination thereof.

The traffic factor 236 is defined as the parameter affecting the travel time 230 based on a traffic flow 237. The traffic factor 236 can be based on the traffic flow 237 on the path 212, a candidate route 260, a drive route 262, or a combination thereof. The traffic flow 237 is defined as total number of vehicles passing a given point in a given time. The traffic flow 237 can be represented as a number of cars present over a distance of the path 212, a number of cars passing the instance of the geographic location on the path 212 per duration of time, or a combination thereof.

The traffic factor 236 can represent a multiplier value based on a comparison between the traffic flow 237 and a traffic threshold 238. The traffic threshold 238 is defined as a metric used for comparison to determine the multiplier value of the traffic flow 237. The traffic threshold 238 can be represented as a number of cars present over a distance of the path 212, a number of cars passing the instance of the geographic location on the path 212 per duration of time, or a combination thereof.

For example, the traffic flow 237 for the instance of the path 212 greater than or equal to the traffic threshold 238 can represent the multiplier value of 2. Continuing in the same example, the traffic flow 237 for the instance of the path 212 lesser in value than the traffic threshold 238 can represent the multiplier value of 1.

A weather factor 240 is defined as the parameter affecting the travel time based on a weather along the path 212. The weather can include atmospheric conditions such as a rain, a sunny, a snow, or a combination thereof. The weather factor 240 can represent a multiplier value based on the type of the weather affecting the travel time 230.

The weather factor 240 can represent a range of alphanumeric value of 0 to 9, A to Z, or a combination thereof based on the weather. For example, the weather of "rain" can represent a multiplier value of 2. In another example, the weather of "sunny" can represent the multiplier value of 1. In an additional example, the weather of "snow" can represent the weather factor 240 of 4.

A physical location 250 is defined as a positional information of a geographic location. For example, the physical location 250 can represent a geographic latitude and longitude system. In another example, the physical location 250 can represent a mailing address.

The displacement 204 is defined as a change in the physical location 250. For example, the physical location 250 of the first device 102 under the two-dimension Cartesian coordinate system can change from the physical location 250 denoted as "B" at (5, 5) in FIG. 2 to another instance of the physical location 250 denoted as "C" at (10, 10) in FIG. 2. In this example, the displacement 204 can be represented as (5, 5) or 7.07 in the northeast direction.

The candidate route 260 is defined as the path 212 connecting a start point 264, a waypoint 266, a destination 268, or a combination thereof. There can be multiple instances of the candidate route 260 connecting the instance of the start point 264, the waypoint 266, the destination 268, or a combination thereof.

The start point 264 is defined as an instance of the physical location 250 where the candidate route 260 begins. The waypoint 266 is defined as an instance of the physical location 250 designated for the first device 102 to navigate to prior to arriving at the destination 268. The waypoint 266 can be designated along the candidate route 260 from the start point 264 to the destination 268. The destination 268 is defined as an instance of the physical location 250 where the candidate route 260 ends. For example, an instance of the candidate route 260 can have an instance of the start point 264, an instance of the destination 268, multiple instances of the waypoint 266, or a combination thereof.

If the start point 264 is not designated or obtained, the physical location 250 of the first device 102 at the current instance of the time can represent the start point 264. In another instance of time, the candidate route 260 can directly connect the start point 264 to the destination 268 if the waypoint 266 is not designated or obtained.

The drive route 262 is defined as the path 212 for travel selected by the navigation system 100. The drive route 262 can represent the instance of the candidate route 260 having greater match of the preference 210 compared to other instances of the candidate route 260. For example, there can be two instances of the candidate route 260. In this example, the first instance of the candidate route 260 can have one instance of the preference 210 matching the user's predilection, while the second instance of the candidate route 260 additionally has three instances of the preference 210 matching the user's predilection. In this example, the second instance of the candidate route 260 can be selected as the drive route 262 because the second instance of the candidate route 260 reflects the user's predilection of the preference 210 more than the first instance of the candidate route 260.

The status information 290 is defined as updatable information obtained by the navigation system 100. For example, the status information 290 can be different based on the different times of the day it is obtained.

Figure 3:
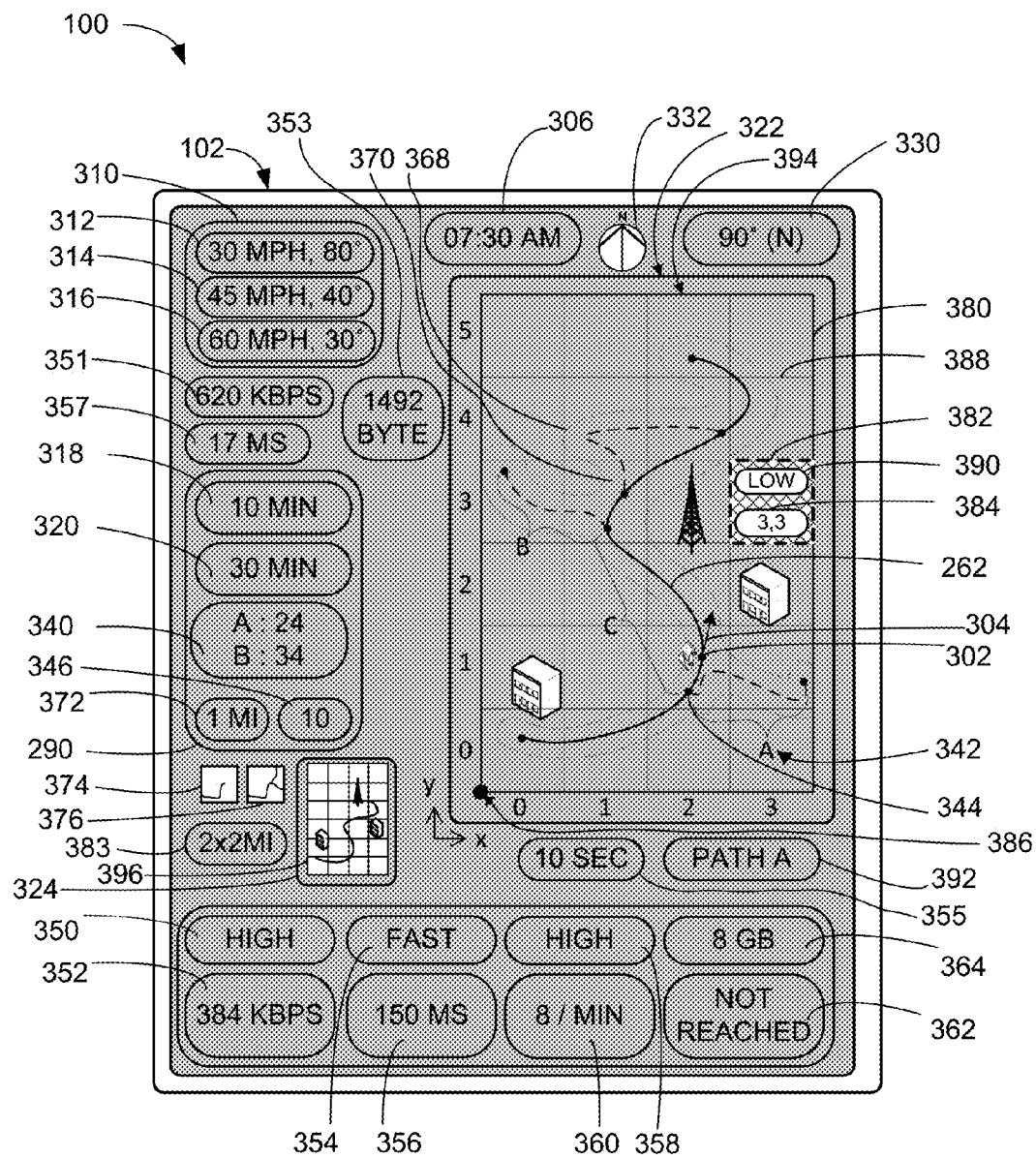
FIG. 3 is further examples of a status information of the navigation system.

Referring now to FIG. 3, there are shown further examples of the status information 290. More specifically as an example, the status information 290 can include a current location 302, a current time 306, a velocity 310, a velocity scope 318, a current direction 330, a route history 340, or a combination thereof.

The current time 306 is defined as the present instance of the time. For example, the current time 306 can be based on the time zone assigned to the geographical area occupied by the first device 102 measured in the international atomic time. The current time 306 can tracked based the atomic clock, mechanical clock, or quartz clock, a combination thereof.

A current location 302 is defined as the physical location 250 of FIG. 2 occupied by the first device 102 at the current time 306. For example, each instance of the first device 102 can be limited to one instance of the current location 302. In this example, multiple instances of the current location 302 can be recognized by the navigation system 100 if multiple instances of the first device 102 exist.

The velocity 310 is defined as a rate of the displacement 204 over time. Various instances of the velocity 310 can be determined based on the range of time covered. More specifically, the type of the velocity 310 can be determined based on a comparison between a velocity scope 318 and a velocity threshold 320. For example, the velocity 310 can include an immediate velocity 312, a short-term velocity 314, a long-term velocity 316, or a combination thereof.

The velocity scope 318 is defined as a pre-set length of the time. The velocity scope 318 can represent the pre-set length of the time prior to the current time 306 for the first device 102 to consider in determining the velocity 310. For example, the velocity 318 can be represented in alphanumeric value of 0 to 9, A to Z, or a combination thereof, such as "minus (−) 300 second (sec)." In this example, the velocity scope 318 can consider the velocity 310 based on the displacement 204 during previous 5 minutes.

The velocity threshold 320 is defined as a metric used for comparison to determine the various types of the velocity 310. For example, the velocity 310 can be categorized as the immediate velocity 312, the short-term velocity 314, the long-term velocity 316, or a combination thereof, based on the relationship between the velocity scope 318 and the velocity threshold 320. The velocity 318 can be represented in alphanumeric value of 0 to 9, A to Z, or a combination thereof, such as "minus 100 sec."

The immediate velocity 312 is defined as an instance of the velocity 310 where the magnitude of the velocity scope 318 is less than the magnitude of the velocity threshold 320. The short-term velocity 314 is defined as the instance of the velocity 310 where the magnitude of the velocity scope 318 is equal to the magnitude of the velocity threshold 320. The long-term velocity 316 is defined as the instance of the velocity 310 where the magnitude of the velocity scope 318 is larger than the magnitude of the velocity threshold 320.

The current direction 330 is defined as the geographical orientation of the first device 102. The current direction 330 can be calculated based on the measurement by a compass 332, the geographical orientation based on the velocity 310, or a combination thereof. The compass 332 is defined as an instrument determining the geographic orientation. The compass 332 can determine the geographic orientation of the first device 102 by capturing the earth's magnetic field, by capturing a rotation of the earth based on a gyroscope, or combination thereof. The compass 332 can determine the magnetic north, the true north, or a combination thereof to use as a frame of reference.

The route history 340 is defined as a record of the path 212 of FIG. 2 previously navigated by the first device 102. A route segment 342 is defined as the path 212 connecting a junction 344. For example, the route history 340 can store the number of times each instance of the route segment 342 was previously navigated by the first device 102, the operator of the first device 102, or a combination thereof. For example, the instance of the route segment 342 can connect another instance of the route segment 342 at a same instance of the junction 344.

A temporary line segment 304 is defined as the construction reference used for generating the extended field 370. For example, the temporary line segment 304 can be based on the velocity 310, the current direction 330, or a combination thereof. More specifically, as an example, the dotted line of FIG. 3 located between the current location 302 and the white open circle can represent the temporary line segment 304.

The junction 344 is defined as the physical location 250 connecting a plurality of the route segment 342. For example, the junction 344 connecting three instances of the route segment 342 can be represented as a three-formed road junction, a three-way junction, or a T-junction. In another example, the junction 344 connecting four instances of the route segment 342 can be represented as a four road junction, an intersection, or a crossing.

The history threshold 346 is defined as a metric used for determining an often navigated instance of the route segment 342. For example, the history threshold 346 can be represented as a number of times the route segment 342 was driven by the first device 102, the operator of the navigation system 100, or a combination thereof.

The status information 290 can also include a bandwidth level 350, a latency level 354, a reliability level 358, a bandwidth limit 362, a bandwidth 351, or a combination thereof. The bandwidth 351 is defined as a rate of transfer of a data packet 353 during a measuring duration 355. For example, the bandwidth 351 can be represented in bits per second (bit/s). The data packet 353 is defined as a block unit of a data transmitted over a network. The data packet 353 can be represented in various ways. For example, the data packet 353 can also be referred as a frame, a block, a cell, a segment, or a combination thereof. In another example, the data packet 353 can contain 1492 bytes of a data as the unit block of data. The measuring duration 355 is defined as a span of time used during the counting of the amount of the data packet 353 communicated. For example, the measuring duration 355 can be represented in units of time such as seconds, minutes, hours, days, or a combination thereof.

The bandwidth level 350 is defined as the network condition based on the bandwidth 351. For example, the bandwidth level 350 can be represented in bits per second (bit/s). The bandwidth level 350 can be represented in various ways. For example, a high value for the bandwidth level 350 can represent a fast network connection where the rate of data transfer is above a bandwidth level threshold 352. For another example, a medium value for the bandwidth level 350 can represent a moderate speed network connection where the rate of data transfer is at the bandwidth level threshold 352. For a different example, a low value for the bandwidth level 350 can represent a slow network connection where the rate of data transfer is below the bandwidth level threshold 352.

The bandwidth level threshold 352 is defined as the metric used for comparison to determine the bandwidth level 350. For example, the bandwidth level threshold 352 can be represented in data transferred per time unit. In a specific example, the bandwidth level threshold 352 can be represented in bits per second (bit/s).

The latency level 354 is defined as the network condition based on a network latency 357. The network latency 357 is defined as the delay in the communication. The network latency 357 can be represented in time unit. For example, if 5 milli-second (ms) is required for an input on a device to be reflected, the network latency 357 can be represented, for example, as 5 ms.

The latency level 354 can be represented in various ways. For example, a high value for the latency level 354 can represent a fast responding connection where the delay in the communication is less than a latency threshold 356. For a different example, a medium value for the latency level 354 can represent a moderate responding connection where the delay in the communication is at the latency threshold 356. For another example, a low value for the latency level 354 can represent a slow responding connection where the delay in the communication is greater than the latency threshold 356.

The latency threshold 356 is defined as a metric used for comparison to determine the connection response represented by the latency level 354. The latency threshold 356 can be selected by the operator of the first device 102, retrieved from the first device 102, retrieved from the second device 106 of FIG. 1, or a combination thereof.

The reliability level 358 is defined as the network condition based on a rate of successful connection confirmations. The reliability level 358 can be represented in various ways. For example, the numerical representation of the reliability level 358 of the network condition can be represented in a number of successful connection confirmations over number of attempted connection confirmation.

A reliability threshold 360 is defined as a metric used for comparison to determine the reliability level 358 of the network connection. The numerical representation of the reliability threshold 360 can be represented by a number of successful connection confirmation over number of attempted connection confirmation. For example, the reliability threshold 360 can be presented in 6 per minute to represent 6 instances of the successful connection confirmation per minute. The reliability threshold 360 can be selected by the operator of the first device 102, retrieved from the second device 106, or a combination thereof.

For example, a high value for the reliability level 358 can represent a greatly dependable network condition where the rate of successful connection confirmation is above the reliability threshold 360. For a different example, a medium value for the reliability level 358 can represent a moderately dependable network condition where the rate of successful connection confirmation is equal to the reliability threshold 360. For another example, a low value for the reliability level 358 can represent an undependable network condition where the rate of successful connection confirmation is below the reliability threshold 360.

The bandwidth limit 362 is defined as the network status representing the limiting of the transfer of a data based on a cap threshold 364. For example, a "limit not reached" instance of the bandwidth limit 362 can represent an amount of data transmitted under the cap threshold 364. For another example, a "limit reached" instance of the bandwidth limit 362 can represent an amount of data transmitted at least equivalent to the cap threshold 364.

The cap threshold 364 is defined as the metric used for comparison to determine the status of the bandwidth limit 362. The cap threshold 364 can represent an amount of communication permitted. For example, the cap threshold 364 can represented an amount of data transmitted per duration of time. The cap threshold 364 can be selected by the operator of the first device 102, stored in the first device 102, retrieved from the second device 106, or a combination thereof.

The status information 290 can further include a map 380, a map tile 382, a tile identification 384, a tile size 383, an extended field 370, an update priority 390, or a combination thereof.

A map 380 is defined as a diagram or collection of data showing an arrangement or distribution of a geographical area. The map 380 can be represented by a first map 394, a second map 396, or a combination thereof. The first map 394 is defined as the instance of the map 380 being checked for an update requirement. The second map 396 is defined as the instance of the map 380 which is used as a reference in comparing to the first map 394.

For clarification, the language "first" or "second" does not denote ordinal or priority relationship. Furthermore, more than one instance of the map 380 can be used for comparison with the first map 394 and the language "second" in the second map 396 does not imply a limit in the number of the map 380 used for comparison. But rather, the language is used for convenience sake to differentiate the two elements. For example, the first map 394 can represent the map 380 stored on the first device 102. For another example, the second map 396 can represent map 380 stored on the second device 106 of FIG. 1. For further example, the first map 394, the second map 396, or a combination thereof can be stored in the first device 102, the second device 106, or a combination thereof.

The map 380 can be an aggregate of the map tile 382. The map 380 can also be partitioned into multiple instances of the map tile 382 based on a map divider grid 388. The map tile 382 is also defined as a diagram or collection of data showing an arrangement or distribution of a geographical area. The plurality of the map tile 382 can cover the geographical area greater than the area covered by a single instance of the map tile 382. For example, the shape of the map tile 382 can include a circle, a polygon, an amorphous shapes, or a combination there of.

The map divider grid 388 is defined as a line running across the map 380 to divide the map 380 into multiple instance of the map tile 382. For example, a single instance of the map divider grid 388 crossing the map 380 can partition the map 380 into two instances of the map tile 382. For another specific example, an instance of the map divider grid 388 can laterally cross the map 380 and another instance of the map divider grid 388 can longitudinally cross the map 380 to partition the map 380 into four instances of the map tile 382.

The tile identification 384 is defined as information distinguishing a specific instance of the map tile 382 from another instance of the map tile 382. The tile identification 384 can represent a meta data associated to each instance of the map tile 382. For example, the tile identification 384 can contain information representing the locational relationship to a base point 386 of the map 380.

A tile size 383 is defined as the dimensional representation of the structure of the map tile 382. The tile size 383 can be represented by a measurement based on the shape of the map tile 382. For example, the tile size 383 of the square instance of the map tile 382 can be represented in combination of two instance of the length, which one instance of the length can represent the height and the other instance of the length can represent the width. In another example, the tile size 383 of the hexagonal instance of the map tile 382 can be represented by the side length, the height, the diagonal length, the area, the perimeter, or a combination thereof.

The base point 386 is defined as the physical location 250 on the map 380 used as a reference point for locating the map tile 382 on the map 380. The location of the map tile 382 can be represented in an alphanumeric value of 0 to 9, A to Z, or a combination thereof based on the number of the map tile 382 away from the base point 386.

For example, the base point 386 can represent the physical location 250 in the south west corner of the map 380. In this example, the instance of the map tile 382 adjacent to the base point 386 represents a location (X0, Y0) according to the tile identification 384. In the same example, another instance of the map tile 382 adjacent to the north of the instance of the map tile 382 at (X0, Y0) can represent the location (X0, Y1) according to the tile identification 384. Another instance of the map tile 382 adjacent to the east of the instance of the map tile 382 at (X0, Y0) can represent the location (X1, Y0) according to the tile identification.

A first map tile 374 is defined as the map tile 382 of the first map 394. For example, the first map tile 374 can be stored in the first device 102, the second device 106, or a combination thereof. More specifically, the first map tile 374 can be compared by another instance of the map tile 382, such as the second map tile 376 to determine the discrepancy 392.

The second map tile 376 is defined as the map tile 382 of the second map 396. For example, the second map tile 376 can be stored in the first device 102, the second device 106, or a combination thereof. More specifically, the second map 376 can be compared to another instance of the map tile 382, such as the first map tile 374 to determine the discrepancy 392.

For clarity and brevity, the embodiment of the present invention will be described with the first map tile 374 as the map tile 382 stored in the first device 102, and the second map tile 376 as the map tile 382 stored in the second device 106. However, the first map tile 374 and the second map tile 376 of can be discussed interchangeably.

The extended field 370 is defined as a selected instance of the geographical area of the map 380. In addition, the extended field 370 can have a greater probability of being displayed on the display monitor than the instance of the geographical area not covered by the extended field 370. For example, an information such as a gas station, a road closure information, or a combination thereof can be displayed on the device. For further example, the extended field 370 can represent the geographical area inside a pre-determined range 372 of the drive route 262. In another example, the extended field 370 can represent the geographical area within the pre-determined range 372 from the drive route 262 or other road that the first device 102 can veer to.

The pre-determined range 372 is defined as the boundary encompassing the physical location 250 that the first device 102 can veer off to during travel. The pre-determined range 372 can be selected by the operator of the first device 102, retrieved from the second device 106, or a combination thereof.

A potential route 368 is defined as the instances of the path 212 with greater likelihood of being traveled in the future compared to other instances of the path 212. The potential route 368 can be based on the drive route 262, the path 212 in the route history 340, the path 212 inside the extended field 380, or a combination thereof. For example, the potential route 368 can be an aggregate of the path 212 in the drive route 262, the path 212 included in the route history 340, the path 212 included in the extended field 380, or a combination thereof. In another example, the potential route 212 can be required to be updated.

An update priority 390 is defined as the identifier assigned to the instance of the map tile 382 providing an order of an update. The update priority 390 can be presented in various way including high value, medium value, and low value. For example, the map tile 382 with high value of the update priority 390 can be updated by the navigation system 100 before the map tile 382 with medium instance and the low instance of the update priority 390. In another example, the map tile 382 with the medium instance of the update priority 390 can be updated by the navigation system 100 before the map tile 382 with the low instance of the update priority 390.

The update priority 390 can be determined based on a discrepancy 392 between multiple instances of the map tile 382. More specifically, the update priority 390 can be determined based on the discrepancy 392 in the map information 216 of FIG. 2 of the map tile 382.

For example, the map information 216 can include a first map information 322 and a second map information 324. The first map information 322 is defined as the map information 216 of the first map 394. For example, the first map information 322 can include the path 212, the traffic sign, the building information, the speed limit, other driving related information, or a combination thereof of the first map 394.

The second map information 324 is defined as the map information 216 of the second map 396. For example, the second map information 324 can include the path 212, the traffic sign, the building information, the speed limit, other driving related information, or a combination thereof of the second map 396. For clarity and brevity, the embodiment of the present invention will be described with the first map information 322 as the map information 216 of the first map 394, and the second map information 324 as the map information 216 of the second map 396. However, the first map information 322 and the second map information 324 can be discussed interchangeably.

More than one instance of the map information 216 can be represented by the first map information 322, the second map information 324, or a combination thereof. Furthermore, the language "first" or "second" does not denote ordinal or priority relationship. In addition, the language "second" in the second map information 324 does not imply a limit in the number of the map information 216 used for comparison. But rather, the language is used for convenience sake to differentiate the two elements. For example, the first map information 322 can represent the map information 216 stored on the first device 102. For another example, the second map information 324 can represent the map information 216 stored on the second device 106 of FIG. 1. For further example, the first map information 322, the second map information 324, or a combination thereof can be stored in the first device 102, the second device 106, or a combination thereof.

The discrepancy 392 is defined as a difference in a quality, a characteristic, a state, the path 212, or a combination thereof. For example, the discrepancy 392 can describe a difference between the first map information 322 of the first map tile 374 and the second map information 324 on the second map 396. In a specific example, the instance of the first map tile 374 for the first map 394 can include the path 212 representing a road A and a road B. Continuing in the specific example, the map tile 382 of the second map 396 can include the path 212 representing only the road B. In this specific example, the discrepancy 392 between the first map information 322 of the first map 394 and the second map information 324 of the second map 396 is the road A because it is present only in the first map 394.

For clarity and brevity, the embodiment of the present invention will be described with the first map tile 374 as the map tile 382 of the first map 394, and the second map tile 376 as the map tile 382 of the second map 396. However, the first map tile 374 and the second map tile 376 can be discussed interchangeably.

More than one instance of the map tile 382 can be represented by the first map 394, the second map 396, or a combination thereof. Furthermore, the language "first" or "second" does not denote ordinal or priority relationship. In addition, the language "second" in the second map tile 376 does not imply a limit in the number of the map tile 382 used for comparison. But rather, the language is used for convenience sake to differentiate the two elements. For example, the first map tile 374 can represent the map tile 382 stored on the first device 102. For another example, the second map tile 376 can represent the map tile 382 stored on the second device 106. For further example, the first map tile 374, the second map tile 376, or a combination thereof can be stored in the first device 102, the second device 106, or a combination thereof.

Figure 4:
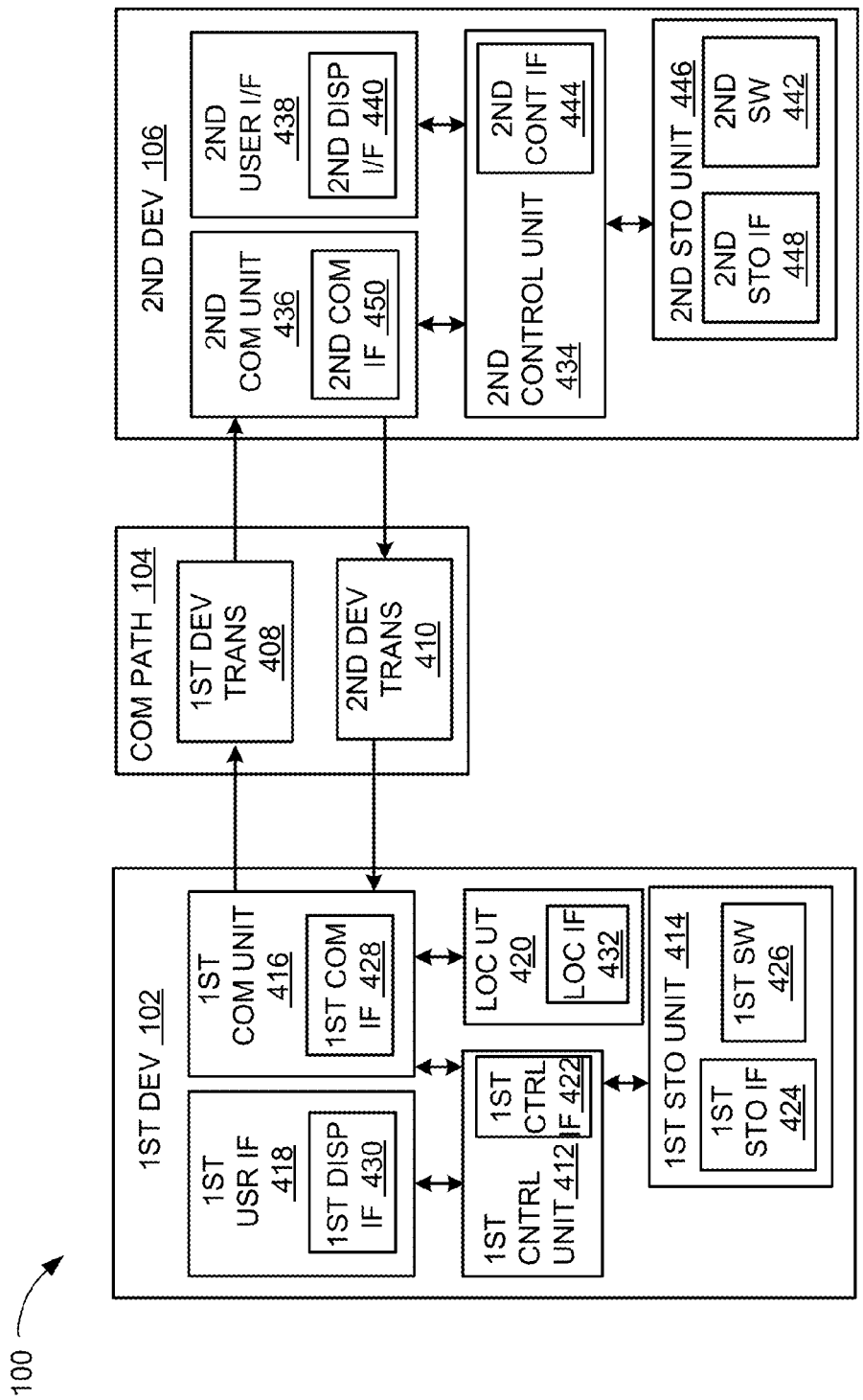
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof.

The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a GPS, an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
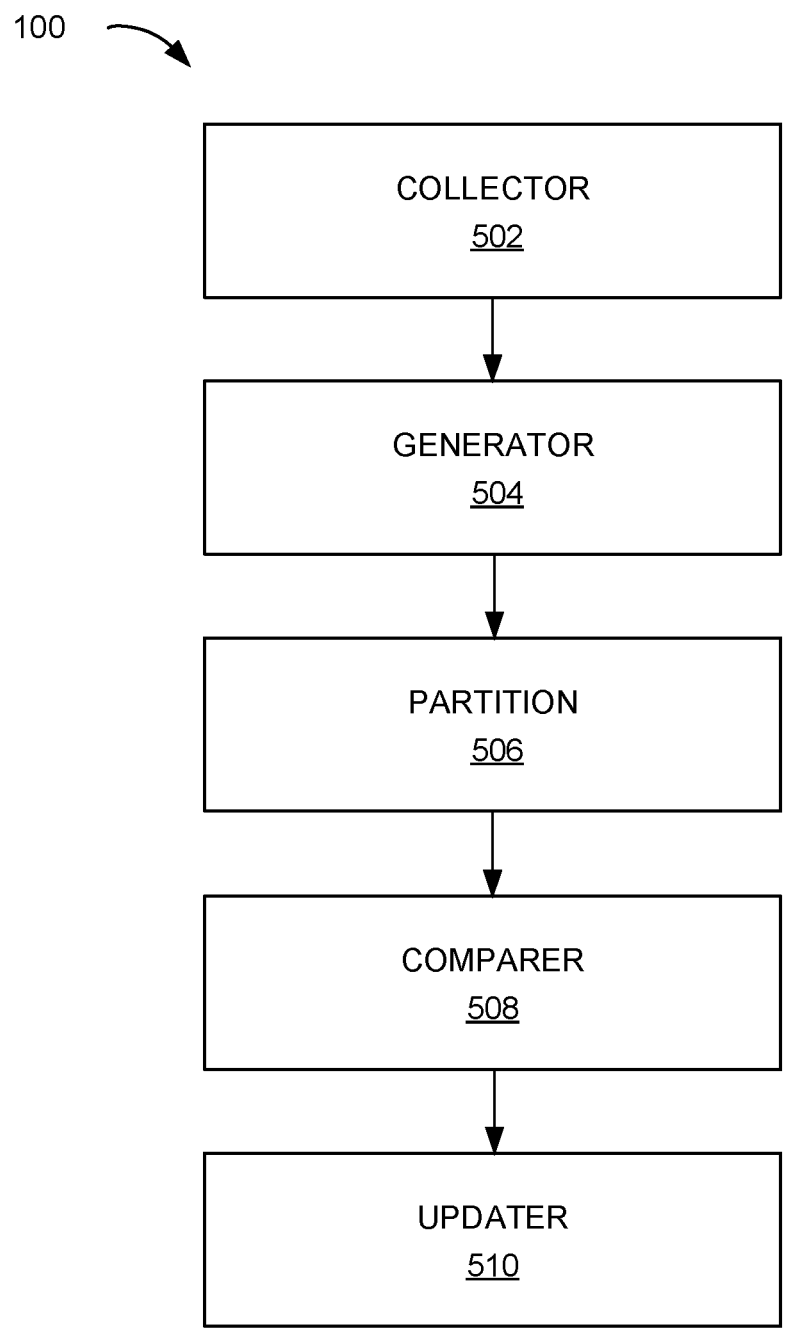
FIG. 5 is a control flow of the navigation system.

Referring now to FIG. 5, therein is shown a control flow of the navigation system 100. The navigation system 100 can include a configuration module 502. The configuration module 502 configures the navigation system 100 based on the navigation information 202 of FIG. 2 and the status information 290 of FIG. 3. For example, the configuration module 502 can determine the navigation information 202 including the displacement 204 of FIG. 2. In addition, the configuration module 502 can obtain the status information 290 including the current location 302 of FIG. 3, the current time 306 of FIG. 3, the velocity 310 of FIG. 3, the current direction 330 of FIG. 3, or a combination thereof. The configuration module 502 can configure the navigation system 100 based on the navigation information 202, the status information 290, or combination thereof in a number of ways.

For example, the configuration module 502 can detect the current location 302. The current location 302 can be detected based on a GPS signal, a beacon signal, an inertial measurement unit (IMU) data, or a combination thereof. The IMU data can be a motion data of the first device 102 of FIG. 1 captured by the IMU through the location unit 420 of FIG. 4.

In this example, the configuration module 502 can detect the current location 302 based on the GPS signal received from a GPS satellite. More specifically, the configuration module 502 can calculate the distance between the first device 102 and the GPS satellite based on the GPS signal. The configuration module 502 can deduce the current location 302 of the first device 102 by trilateration to compare each distance between the multiple instances of the GPS satellite and the first device 102.

In another example, the configuration module 502 can detect the current location 302 of the first device 102 based on the beacon signal emitted from a beacon. For example, the beacon can be positioned in a tunnel, a street, a bridge, a floating platform, a seabed, a balloon, or a combination thereof. A beacon receiver representing the location unit 420 can be installed on the first device 102 to capture the beacon signal through location interface 432 of FIG. 4 by passing within a range of the beacon signal. The beacon signal can include the information related to the physical location 250 of FIG. 2.

For another example, the configuration module 502 can determine the current location 302 by combining the displacement 204 based on the IMU data to a previously detected instance of the physical location 250. In one example, the configuration module 502 can determine the physical location 250 of the first device 102 by combining the displacement 204 calculated from the IMU data to the physical location 250 detected from the GPS signal, the beacon signal, or a combination thereof.

The configuration module 502 can determine the physical location 250 of the first device 102 using the Cartesian coordinate system. For example, the direction denoted by "x" on FIG. 3 can represent the lateral component of the physical location 250. In the same example, the direction denoted by "y" on FIG. 3 can represent the longitudinal component of the physical location 250. In this example, the physical location 250 positively increasing in value in the x and the value in y can represent the physical location 250 closer to the Eastern and Northern direction of the geographical area, respectively. The physical location 250 decreasing in value toward a negative value of the x value and the y value can represent the physical location 250 closer to the Western and Southern direction of the geographical area, respectively.

A subscript under the x and the y can represent the physical location 250 of the first device 102 at a specific instance of time. For example, the subscript can represent the physical location 250 at the specific instance of time by a combination of alphanumeric value such as "2 sec." In this example, the subscript can represent the physical location 250 in the instance of time 2 seconds in the future from the current time 306. In another example, the subscript can also represent the physical location 250 at the specific instance of time by combination of alphanumeric value such as "minus 4 sec" to represent the physical location 250 at the instance of time 4 seconds prior to the current time 306.

A subscript of "t" under the x and the y can also represent the physical location 250 at the specific instance of time. As in the prior examples, a positive value of t can represent the future instance of the time and the negative number can represent the past instance of the time. For example, the instance of the physical location 250 at time t can represent $(x_t, y_t)$. For a specific example, t=−5 can represent the physical location 250 of the first device 102 at the instance of the time 5 seconds prior to the current time 306, represented as $(x_{-5\ sec}, y_{-5\ sec})$.

The subscripts under x and y can also be a string of characters such as "last" to represent the last known instance of the physical location 250. For example, the previous instance of the physical location 250 of the first device 102 determined can be expressed as $(x_{last}, y_{last})$. Alternatively, the subscripts such as "current" can represent the current location 302.

The configuration module 502 can also determine the displacement 204. For example, the configuration module 502 can determine the displacement 204 by tracking the change in the physical location 250. The configuration module 502 can obtain the current time 306 from the internal time measurement system. In another example, the configuration module 502 can obtain the current time 306 based on the synchronized atomic clock from the second device 106 of FIG. 1.

For example, (10, 10) can represent $(x_{last}, y_{last})$, the last known instance of the physical location 250. In this example, the location unit 420 can thereafter calculate the displacement 204 in the x direction of 2, and in the y direction of −4. As a result, the configuration module 502 can combine the last known instance of the physical location 250 of $(x_{last}, y_{last})$ at (10, 10) and the displacement 204 of (2, −4) calculated by the location unit 420 to determine the current location 302 of $(X_{current}, y_{current})$ at (12, 6).

The configuration module 502 can determine the velocity 310 based on the displacement 204 and the duration of time measured. The configuration module 502 can determine the various types of the velocity 310 including the immediate velocity 312 of FIG. 3, the short-term velocity 314 of FIG. 3, the long-term velocity 316 of FIG. 3, or a combination thereof.

The configuration module 502 can determine the various instances of the velocity 310 in a number of ways. For example, the configuration module 502 can determine the various instances of the velocity 310 based on the relationship between the velocity threshold 320 of FIG. 3 and the duration of time measured represented by the velocity scope 318 of FIG. 3. For a specific example, the configuration module 502 can determine the velocity scope 318 by retrieving an entry of alphanumeric value of 0 to 9, A to Z, or combination thereof. The configuration module 502 can also access the devices to retrieve the velocity scope 318.

More specifically, the configuration module 502 can retrieve the velocity threshold 320 by retrieving an entry of alphanumeric value of 0 to 9, A to Z, or combination thereof. The configuration module 502 can also access the first device 102, the second device 106, or a combination thereof to retrieve the velocity threshold 320.

For example, the configuration module 502 can determine the immediate velocity 312 when the magnitude of the velocity scope 318 is less than the magnitude of the velocity threshold 320. In a specific example, the velocity threshold 320 can be t=−11 sec, and the velocity scope 318 can be t=−1 sec. Since the magnitude of the velocity scope 318 is less than the magnitude of the velocity threshold 320, the configuration module 502 can determine the immediate velocity 312.

In this example, the configuration module 502 can determine the immediate velocity 312 based on the displacement 204 during t=−1 sec to t=0 sec. In this example, the physical location 250 at t=−1 sec can be $(x_{-1sec}, y_{-1sec})=(80, 81)$, and the current location 302 at t=0 sec can be $(x_{0sec}, y_{0sec})=(92, 81)$. Based on the displacement 204 during the past 1 second duration, the configuration module 502 can determine the immediate velocity 312 of 12 per second in the direction of 0 degrees.

In another example, the configuration module 502 can determine the short-term velocity 314 if the magnitude of the velocity scope 318 is equal to the magnitude of the velocity threshold 320. In a specific example, both the velocity scope 318 and the velocity threshold 238 can be t=−11 sec. For example, the configuration module 502 can determine the short-term velocity 314 based on the displacement 204 during the velocity scope 318 from t=−11 sec to t=0 sec. In this example, the instance of the physical location 250 at the t=−11 sec can be $(x_{-11sec}, y_{-11sec})=(50, 40)$, and the current location 302 at t=0 sec can be $(x_{0sec}, y_{0sec})=(92, 81)$. Based on the displacement 204 during this 11 second scope, the configuration module 502 can determine the short-term velocity 314 of 58.7 per 11 seconds at 44.3 degrees, or 5.34 per second in the direction of 44.3 degrees.

In another example, the configuration module 502 can determine the long-term velocity 316 when the magnitude of the velocity scope 318 is greater than the magnitude of the velocity threshold 320. In a specific example, the velocity scope 318 can be t=−3600 sec and the velocity threshold 320 can be t=−11 sec. Since the magnitude of the velocity scope 318 is greater than the velocity threshold 320, the configuration module 502 can determine the long-term velocity 316 based on the displacement 204 during t=−3600 to t=0. In this example, the instance of the physical location 250 at t=−3600 seconds can present $(x_{-3600\ sec}, y_{-360011\ sec})=(-2000, -1500)$, and the current location 302 at t=0 sec can present $(x_{0sec}, y_{0sec})=(92, 81)$. Based on the displacement 204 during this duration of time, the configuration module 502 can determine the long-term velocity 316 of 2622.2 per 3600 seconds at 37.1 degrees, or 0.73 per second in the direction of 37.1 degrees.

The configuration module 502 can determine the current direction 330 in a number of ways. For example, the configuration module 502 can determine the current direction 330 from a calculation based on a measurement by the compass 332 of FIG. 3, the velocity 310, or a combination thereof.

The configuration module 502 can determine the current direction 330 by capturing the direction pointed by the first device 102 based on the measurement by the compass 332.

For example, the compass 332 can point to the direction at 30 degrees in the counter-clockwise direction from northern direction captured by the compass 332. If the northern direction represents the direction of −90 degrees on the compass 332, the direction pointed by the compass 332 is −90 degrees minus 30 degrees, resulting in the direction of −120 degrees. The configuration module 502 can determine the direction pointed by the compass 332 as the current direction 330.

For another example, the configuration module 502 can also determine the current direction 330 based on the immediate velocity 312. In this example, the configuration module 502 can duplicate the direction of the immediate velocity 312. For example, as the direction of the immediate velocity 312 presented in the previous example was 0 degrees, the configuration module 502 can determine the current direction 330 as 0 degrees.

The configuration module 502 can determine multiple instances of the physical location 250 along a drive route 262 of FIG. 2. A plurality of the physical location 250 along the drive route 262 can include the start point 264 of FIG. 2, the destination 268 of FIG. 2, the waypoint 266 of FIG. 2, or a combination thereof. The configuration module 502 can determine the physical location 250 in various ways.

For example, the configuration module 502 can determine the physical location 250 represented in a geographic latitude and longitude system. In this example, the physical location 250 can be represented in an alphanumeric value of 0 to 9, A to Z. For example, the configuration module 502 can determine the physical location 250 of the Ferry Building in San Francisco, Calif. (CA) by retrieving the ordered pair of "37.795029, −122.393087." In this example, the configuration module 502 can determine the first value of the ordered pair as the value representing a longitude component of the physical location 250. In the same example, the configuration module 502 can obtain the second value of the ordered pair as the value representing latitude component of the physical location 250.

In another example, the configuration module 502 can determine the physical location 250 based on the mailing address system. In this example, the configuration module 502 can determine the physical location 250 by parsing the multiple instances of the string of alphanumeric characters separated by commas. In one example, the configuration module 502 can determine the multiple instances of the string of characters such as "1, Sausalito, San Francisco, Calif., 94105, USA" to indicate the San Francisco Ferry Building located in San Francisco, Calif. In this example, the configuration module 502 can determine the first string of alphanumeric characters as the building number, the second string as the street name, the third string as the name of the city, the fourth string as the name of the state, the fifth string as the zip code, and the sixth string as the name of the country. The configuration module 502 can also store the physical location 250 presented in the string of alphanumeric characters in the first device 102, the second device 106, or combination thereof.

The configuration module 502 can determine the navigation information 202 including the preference 210 of FIG. 2. The preference 210 can include the scenic view 220 of FIG. 2, the safety level 222 of FIG. 2, the travel cost level 226 of FIG. 2, the travel time 230 of FIG. 2, or a combination thereof. The configuration module 502 can determine the various instances of the preference 210 in a number of ways.

The configuration module 502 can determine the scenic view 220 in various ways. For example, the configuration module 502 can retrieve a list containing different types of the scenic view 220. Continuing in this example, the configuration module 502 can present the retrieved type of the scenic view 220 to the operator of the first device 102 through the first user interface 418 of FIG. 4 for selection. The configuration module 502 can capture the type of the scenic view 220 selected by the operator of the first device 102 through the first user interface 418. The configuration module 502 can determine the scenic view 220 selected as the preference 210 of the first device 102. In addition, the configuration module 502 can store the scenic view 220 in the first storage unit 414 of FIG. 4, the second storage unit 446 of FIG. 4, or a combination thereof.

The configuration module 502 can determine the safety level 222 in various ways. For example, the configuration module 502 can determine the safety level 222 through the first device 102, the second device 106, or a combination thereof. In an example, the configuration module 502 can access the first device 102 to obtain the stored instance of the safety level 222. In another example, the configuration module 502 can access the first device 102 to obtain the accident rate to compare with the safety threshold 224 of FIG. 2.

The configuration module 502 can determine the safety threshold 224 in various ways. For example, the configuration module 502 can obtain the safety threshold 224 from the first storage unit 414, the second storage unit 446, or a combination thereof. The configuration module 502 can also obtain the safety threshold 224 through the first user interface 418.

The configuration module 502 can determine the travel cost level 226 in various ways. For example, the configuration module 502 can access the first device 102 to obtain the various values of the travel cost level 226 for selection. For further example, the configuration module 502 can present various values of the travel cost level 226 including a low value and a high value for the travel cost level 226. The configuration module 502 can obtain the selection of the value of the travel cost level 226 through an input on the first communication unit 416, from the user through the first user interface 418, or a combination thereof. The configuration module 502 can store the obtained instance of the travel cost level 226 in the first device 102, the second device 106, or a combination thereof.

The configuration module 502 can determine the transportation expense 228 of FIG. 2 in various ways. For example, the configuration module 502 can access the first device 102, the second device 106, or a combination thereof, to determine the transportation expense 228 associated to each instances of the physical location 250, each instance of the path 212, or a combination thereof.

The configuration module 502 can determine the travel time level 214 of FIG. 2 in various ways. For example, the configuration module 502 can access the first device 102, the second device 106, or a combination thereof to determine the instance of the travel time level 214. In another example, the configuration module 502 can present various instances of the travel time level 214 including the low value, the medium value, the high value, or combination thereof for selection. The configuration module 502 can obtain the selected instance of the travel time level 214 through the first user interface 418. The configuration module 502 can also store the obtained instance of the travel cost level 226 to the first storage unit 414.

The configuration module 502 can determine the travel time 230 in various ways. For example, the configuration module 502 can access the first device 102, the second device 106, or a combination thereof to obtain the travel time 230 for each instances of the path 212. The configuration module 502 can determine the travel time 230 represented by the combination of the numerical value ranging from 0~9, indicating the duration of time required to travel the path 212. For example, the numerical value of "30" can represent the duration of 30 seconds, while the numerical value of "3662" can represent the travel time of 1 hour 1 minute and 2 seconds.

The configuration module 502 can also determine the status information 290 including the route history 340 of FIG. 3. The configuration module 502 can determine the route history 340 in various ways.

For example, the configuration module 502 can access the first device 102, the second device 106, or a combination thereof to retrieve the route history 340. From the retrieved instance of the route history 340, the configuration module 502 can count the number of times each instance of the route segment 342 of FIG. 3 have been traveled in the past.

The configuration module 502 can obtain the history threshold 346 of FIG. 3 in various ways. For example, the configuration module 502 can access the first device 102, the second device 106, or a combination thereof to obtain the value of the history threshold 346. In another example, the configuration module 502 can present multiple pre-set values representing the history threshold 346 to the operator of the first device 102 for selection. In this example, the configuration module 502 can obtain the selected instance of the pre-set value as the history threshold 346 through the first user interface 418. The configuration module 502 can store the obtained instance of the history threshold 346 in the first storage unit 414, the second storage unit 446, or a combination thereof.

The configuration module 502 can determine the status information 290 including the bandwidth level 350 of FIG. 3, the latency level 354 of FIG. 3, the reliability level 358 of FIG. 3, the bandwidth limit 362 of FIG. 3, the map 380 of FIG. 3, or a combination thereof based on the network environment. The configuration module 502 can determine the status information 290 in various ways.

For example, the configuration module 502 can determine the bandwidth level 350 based on the bandwidth 351 of FIG. 3 and the bandwidth level threshold 352 of FIG. 3. In this example, the configuration module 502 can control a device to send a maximum number of the data packet 353 of FIG. 3 possible to another device and count the number of the data packet 353 communicated during the measuring duration 355 of FIG. 3 for determining the bandwidth 351. In a specific example, the configuration module 502 can control the first device 102, the second device 106, or a combination thereof to send a maximum number of the data packet 353 during the measuring duration 355 of 10 seconds, resulting in 100 instances of the data packet 353 communicated. In this specific example, a single instance of the data packet 353 can contain 1492 bytes of data. Continuing in this specific example, the configuration module 502 can determine the bandwidth 351 as 1000 instances of the data packet 353 communicated per 10 seconds of the measuring duration 355. In this specific example, the bandwidth 351 can also be expressed as 10 packets/second, or 146 kilobyte per second (146 kBps).

The bandwidth level threshold 352 can be obtained by the configuration module 502 as an alphanumeric combination of 0 to 9, or A to Z, or a combination thereof from the first device 102, the second device 106, or a combination thereof.

For example, if the bandwidth 351 is greater than the bandwidth level threshold 352, the configuration module 502 can determine the bandwidth level 350 as high value.

When the bandwidth 351 is the same as the bandwidth level threshold 352, the configuration module 502 can determine the bandwidth level 350 of medium value. When the bandwidth 351 is lower than the bandwidth level threshold 352, the configuration module 502 can determine the bandwidth level 350 of low value.

In a specific example, the bandwidth level threshold 352 can be 384 kilobits per second (kbps). In this example, if the bandwidth 351 was less than 384 kbps, the configuration module 502 can determine the bandwidth level 350 as low value. In another example, if the bandwidth 351 is 384 kbps, the configuration module 502 can determine the bandwidth level 350 as medium value. In a further example, if the bandwidth 351 is more than 384 kbps, the configuration module 502 can determine the bandwidth level 350 of high value.

The configuration module 502 can determine the status information 290 representing the response speed between devices by determining the latency level 354. The latency level 354 can be determined in various ways.

For example, the configuration module 502 can determine the latency level 354 based on the network latency 357 and the latency threshold 351. The configuration module 502 can determine the network latency 357 by pinging between devices. For example, configuration module 502 can ping a device to measure the total time required to send a data to the device and retrieve a response representing the network latency 357. In this example, if the network latency 357 is under the latency threshold 356, the configuration module 502 can determine the instance of the latency level 354 as low value. In the same example, if the network latency 357 is equal to the latency threshold 356, the configuration module 502 can determine the instance of the latency level 354 of medium value. If the network latency 357 exceeds the latency threshold 356, the configuration module 502 can determine the instance of the latency level 354 of low value. The configuration module 502 can obtain the latency threshold 356 from the first storage unit 414, the second storage unit 446, the first user interface 418, or a combination thereof.

For a specific example, if the latency threshold 356 is 250 milli-seconds (ms) and the network latency 357 monitored is 100 ms, the configuration module 502 can determine the instance of the latency level 354 as high value. If the network latency 357 monitored is 250 ms, the configuration module 502 can determine the instance of the latency level 354 of medium value. If the network latency 357 monitored is 400 ms, the configuration module 502 can determine the instance of the latency level 354 of low value.

The configuration module 502 can determine the status information 290 representing the reliability of the network connection by retrieving the reliability level 358 of FIG. 3. The configuration module 502 can determine the reliability level 358 in various ways. For example, the configuration module 502 can determine the reliability level 358 by comparing the number of a successful connection confirmation as a function of time against the number of a successful connection confirmation as a function of time of the reliability threshold 360.

For example, if the number of a successful connection confirmation is more than the reliability threshold 360, the configuration module 502 can determine the reliability level 358 of high value. If the number of the successful connection confirmation is the same as the reliability threshold 360, the configuration module 502 can determine the reliability level 358 of medium value. If the number of the successful connection confirmation is less than the reliability threshold 360, the configuration module 502 can determine the reliability level 358 of low value. The reliability threshold 360 can also be obtained by the configuration module 502 by accessing the first storage unit 414, the second storage unit 446, or a combination thereof.

For example, the configuration module 502 can control the second device 106 to transmit a connection confirmation packet to the first device 102 every 6 seconds, resulting in 10 maximum confirmations per minute. The configuration module 502 can count the number of the connection confirmation packet received by the first device 102 per minute to determine the reliability level 358. In a specific example, the reliability threshold 360 can be 8 instances of the connection confirmation packet per minute. In this example, the configuration module 502 can determine the reliability level 358 as high value if the first device 102 receives a number of the connection confirmation packet that is greater than the reliability threshold 360.

In another example with the same instance of the reliability threshold 360, the configuration module 502 can determine the reliability level 358 of medium value if the first device 102 receives same number of the connection confirmation packet as the reliability threshold 360. In a further example with the same instance of the reliability threshold 360, the configuration module 502 can determine the reliability level 358 of low value if the first device 102 receives less number of the connection confirmation packet than the reliability threshold.

The configuration module 502 can determine the bandwidth limit 362 in various ways. For example, the configuration module 502 can access the first storage unit 414 to obtain the instance of the bandwidth limit 362, such as "limit not reached" and "limit reached."

In another example, the configuration module 502 can access the first storage unit 414, the second storage unit 446, or a combination thereof to retrieve the total amount of data communicated. The configuration module 502 can compare the total amount of data to the cap threshold 364 of FIG. 3. The configuration module 502 can determine the instance of the bandwidth limit 362 of "limit not reached" if the total amount of data communicated is less than the cap threshold 364. Alternatively, the configuration module 502 can determine the instance of bandwidth limit 362 of "limit reached" if the total amount of data communicated between the first device 102 and the second device 106 is equal to or greater than the cap threshold 364.

The configuration module 502 can determine the cap threshold 364 in various ways. For example, the configuration module 502 can determine the cap threshold 364 based on a user provided entry through the first user interface 418. The configuration module 502 can obtain the user provided entry by retrieving an entry of alphanumeric value of 0 to 9, A to Z, or combination thereof. For example, the configuration module 502 can determine the cap threshold 364 of 2 gigabytes per month by capturing the entry of the value "2 GB PER MONTH" through the first user interface 418.

In an alternative example, the configuration module 502 can obtain the cap threshold 364 stored in the first device 102, the second device 106, or a combination thereof. For example, the configuration module 502 can access the first storage unit 414 of the first device 102 and retrieve the value of the cap threshold 364, such as "1 GB."

The configuration module 502 can determine the map 380 used by the navigation system 100 in various ways. For example, the configuration module 502 can access the first device 102, the second device 106, or a combination thereof to determine the map 380. In another example, the configuration module 502 can access the first device 102, the second device 106, or a combination thereof to obtain the map 380.

The configuration module 502 can determine the first map 394 of FIG. 3 used by the navigation system 100 in various ways. For example, the configuration module 502 can access the first device 102, the second device 106, or a combination thereof to determine the first map 394. In another example, the configuration module 502 can access the first device 102, the second device 106, or a combination thereof to obtain the first map 394.

The configuration module 502 can determine the second map 396 of FIG. 3 used by the navigation system 100 in various ways. For example, the configuration module 502 can access the first device 102, the second device 106, or a combination thereof to determine the second map 396. In another example, the configuration module 502 can access the first device 102, the second device 106, or a combination thereof to obtain the second map 396.

The configuration module 502 can determine the map information 216 of FIG. 2 used by the navigation system 100 in various ways. For example, the configuration module 502 can access the first device 102, the second device 106, or a combination thereof to determine the map information 216. The determined instance of the map information 216 can include the path 212, a traffic sign, a building information, a speed limit, other driving related information, or a combination thereof.

For another example, the configuration module 502 can also access the first device 102, the second device 106, or a combination thereof to determine the first map information 322 of FIG. 3, the second map information 324 of FIG. 3, or a combination thereof. The determined instance of the first map information 322 can include the path 212, a traffic sign, a building information, a speed limit, other driving related information, or a combination thereof. The determined instance of the second map information 324 can also include the path 212, a traffic sign, a building information, a speed limit, other driving related information, or a combination thereof. The configuration module 502 can communicate the navigation information 202, the status information 290, or a combination thereof to a generator module 504.

The navigation system 100 can include the generator module 504, which can couple to the configuration module 502. The generator module 504 generates the drive route 262 of FIG. 2, the candidate route 260, the extended field 370 of FIG. 3, or a combination thereof. For example, the generator module 504 can generate the drive route 262, the candidate route 260, the extended field 370 or a combination thereof based on the navigation information 202, the status information 290, or a combination thereof.

The generator module 504 can generate the candidate route 260 in a number of ways. For example, the generator module 504 can generate the candidate route 260 based on the start point 264, the destination 268, the waypoint 266, the preference 210, the live information 234 of FIG. 2, or a combination thereof.

For a specific example, the generator module 504 can generate the candidate route 260 by connecting the path 212 from the start point 264 to the destination 268 through the waypoint 266. In this example, the generator module 504 can generate the candidate route 260 starting at the start point 264, which can be denoted as "A" inside the box in FIG. 2. The generator module 504 can continue to generate the candidate route 260 to the waypoint 266, which can be denoted as "D" in the box in FIG. 2. The generator module 504 can complete the candidate route 260 by continuing to generate the candidate route 260 from the waypoint 266 denoted as "D" to the destination 268 denoted as "E" by the star in FIG. 2. In another words, the generator module 504 can generate the candidate route 260 by connecting the start point 264, the waypoint 266, and the destination 268, respectively, in the order of travel.

The generator module 504 can also generate the candidate route 260 without the waypoint 266. For example, if the configuration module 502 only determines the start point 264 and the destination 268, the generator module 504 can generate the candidate route 262 by connecting the path 212 directly from the start point 264 to the destination 268.

The generator module 504 can also generate the candidate route 260 by connecting multiple instances of the route segment 342. For example, the generator module 504 can generate the candidate route 260 based on the route segment 342 between two instances of the physical location 250. For a specific example, the generator module 504 can generate the route segment 342 by having the route segment 342 between the physical location 250 denoted as "A" in FIG. 2 and the physical location 250 denoted as "B" in FIG. 2.

The generator module 504 can generate another instance of the route segment 342 by having the route segment 342 between the physical location 250 denoted as "B" and the physical location 250 denoted as "C" in FIG. 2. The generator module 504 can generate further instance of the route segment 342 by having the route segment 342 between the physical location 250 denoted as "C" and the physical location 250 denoted as "D" in FIG. 2. The generator module 504 can generate another instance of the route segment 342 by having the route segment 342 between the physical location 250 denoted as "D" in FIG. 2 and the physical location 250 denoted as "E" in FIG. 2. The generator module 504 can parse the multiple instances of the route segment 342 by connecting each instances of the route segment 342 to another instance of the route segment 342 at the same physical location 250 to generate the candidate route 260.

The generator module 504 can also substitute the start point 264 with the current location 302 if the configuration module 502 did not determine the start point 264. For example, if the configuration module 502 did not determine the start point 264 and the physical location 250 is at the current location 302 is "B" in FIG. 2, the generator module 504 can substitute the physical location 250 of "B" as the start point 264.

The generator module 504 can generate the drive route 262 based on the preference 210, the live information 234, the candidate route 260, or a combination thereof. More specifically, the generator module 504 can generate the drive route 262 based on the scenic view 220 of FIG. 2, the safety level 222 of FIG. 2, the travel cost level 226 of FIG. 2, the travel time level 214 of FIG. 2, or a combination thereof.

The generator module 504 can retrieve the preference 210 included in each instance of the candidate route 260 from the first device 102, the second device 106, or a combination thereof. The generator module 504 can compare the preference 210 included in the instance of the candidate route 260 to the preference 210 determined for the first device 102, the operator of the first device 102, or a combination thereof. The generator module 504 can select the instance of the candidate route 260 containing the preference 210 that matches with the preference 210 stored in the first device 102 as the drive route 262. For example, the generator module 504 can select the instance of the candidate route 260 containing the scenic view 220 of the "desert" as the drive route 262 if the scenic view 220 of the preference 210 is also the "desert."

In another example, the generator module 504 can select the instance of the candidate route 260 containing the most number of the preference 210 with a high value as the drive route 262. If multiple instances of the candidate route 260 contain the same numbers of the preference 210 with a high value, the generator module 504 can select the instance of the candidate route 260 containing the most number of the medium value instances of preference 210.

The generator module 504 can also select the candidate route 260 as the drive route 262 using a score system. A finite value used to illustrate the score is exemplary and can be replaced by other values for the given context. In this example, the generator module 504 can assign a score to represent 2 to the candidate route 260 having the high value for the safety level 222, the high value for the travel cost level 226, or the high value for the travel time level 214. In the same example, the generator module 504 can assign the score to represent, for example, 1 to the candidate route 260 having the medium value for the safety level 222, the medium value for the travel cost level 226, or the medium value for the travel time level 214. Continuing further in the same example, the generator module 504 can assign the score to represent, for example, 0 to the candidate route 260 having each instance of the low value for the safety level 222, the low value for the travel cost level 226, or the low value for the travel time level 214.

The generator module 504 can compare the total number of point in the instance of the candidate route 260 to another instance of the candidate route 260. The generator module 504 can select the candidate route 260 having the highest value for the score as the drive route 262.

The generator module 504 can modify the travel time 230 with the projected drive time 232 of FIG. 2 based on the live information 234. More specifically, the generator module 504 can modify the travel time 230 based on the live information 234 including the traffic factor 236, the weather factor 240, or a combination thereof. The generator module 504 can access the first storage unit 414, the second storage unit 446, or a combination thereof to retrieve the travel time 230 linked to each instances of the route segment 342.

The generator module 504 can determine the traffic factor 236 in various ways. For example, the generator module 504 can obtain the traffic factor 236 from the first storage unit 414, the second storage unit 446, or a combination thereof. In another example, the generator module 504 can determine the traffic factor 236 based on a traffic flow 237 and the traffic threshold 238 of FIG. 2.

For example, the generator module 504 can access the first device 102, the second device 106, or a combination thereof to retrieve the traffic flow 237 for each instance of the route segment 342 in the map 380. In another example, the generator module 504 can retrieve the traffic threshold 238 from the first device 102, the second device 106, or a combination there of.

The generator module 504 can compare the traffic flow 237 with the traffic threshold 238 to determine the traffic factor 236. A finite value used to illustrate the traffic factor 236 is exemplary and can be replaced by other values for the given context. For example, if the number of vehicles on the instance of the route segment 342 based on the traffic flow 237 is greater than the traffic threshold 238, the generator module 504 can determine the traffic factor 236 to represent, for example, 2. In another example, if the number of vehicles on the instance of the route segment 342 based on the traffic flow 237 is less than the traffic threshold 238, the generator module 504 can determine the traffic factor 236 to represent, for example, 1. The generator module 504 can assign the average of the traffic factor 236 based on each instance of the route segment 342 included in the candidate route 260 as the traffic factor 236 of the candidate route 260. The generator module 504 can store the determined instance of the traffic factor 236 in the first storage unit 414, the second storage unit 446, or a combination thereof.

The generator module 504 can determine the weather factor 240 in various ways. More specifically, the generator module 504 can determine the weather factor 240 by retrieving the weather factor 240 associated to each type of the weather. For example, the weather factor 240 for the weather type "rain" can represent, for example, 2. In another example, the weather factor 240 for the weather type "sunny" can represent, for example, 1. The generator module 504 can retrieve the current instance of the weather type for each instance of the route segment 342 on the map 380. A finite value used to represent the weather factor 240 is exemplary and can be replaced by other values for the given context.

For example, if the instance of the route segment 342 currently has a weather type representing "rain", the weather factor 240 can represent, for example, 2. If another instance of the route segment 342 currently has the weather type representing "sunny", the weather factor 240 for this instance of the route segment 342 can represent, for example, 1. The generator module 504 can determine the weather factor 240 for each instance of the candidate route 260 based on the average value of the weather factor 240 of the route segment 342 representing the candidate route 260.

The generator module 504 can multiply the travel time 230 by the traffic factor 236 for each instance of the route segment 342 to generate the projected drive time 232. The generator module 504 can aggregate the projected drive time 232 for each instance of the route segment 342 representing the candidate route 260 to generate the projected drive time 232 of the candidate route 260. The generator module 504 can compare the projected drive time 232 between instances of the candidate route 260 to select the instance of the candidate route 260 with the least amount of time of the projected drive time 232 as the drive route 262.

For a specific example, the generator module 504 can generate two instances of the candidate route 260 between the start point 264 and the destination 268 including different path. The generator module 504 can retrieve the travel time 230 of 1.0 hour, 0.5 hour, and 2.0 hours for the three instances of the route segment 342 representing the first instance of the candidate route 260. The generator module 504 can retrieve the traffic factor 236 of 2.0 for the three instances of the route segment 342 representing the first instance of the candidate route 260 from the first storage unit 414, the second storage unit 426, or a combination thereof.

Based on the retrieved instance of the travel time 230 and the traffic factor 236, the generator module 504 can calculate the projected drive time 232 of 2.0 hours, 1.0 hour, and 4.0 hours for the three instances of the route segment 342 representing the first instance of the candidate route 260. The generator module 504 can aggregate the projected drive time 232 for each instances of the route segment 342 representing the first instance of the candidate route 260 to determine the projected drive time 232 of 7.0 hours for the first instance of the candidate route 260. In another example, under the same process, the generator module 504 can determine the projected drive time 232 of 2.0 hours for the second instance of the candidate route 260.

After the projected drive time 232 for the two instances of the candidate route 260 is determined, the generator module 504 can compare the projected drive time 232 of 7.0 hours and 2.0 hours for the first and the second instance of the candidate route 260, respectively. The generator module 504 can select the second instance of the candidate route 260 with 2.0 hours of the projected drive time 232 as the drive route 262 since the projected drive time 232 is the shorter than the first instance of the candidate route 260.

For a different example, the generator module 504 can retrieve the weather factor 240 linked to each instance of the route segment 342 representing the candidate route 260 from the first storage unit 414, the second storage unit 426, or a combination thereof. The generator module 504 can multiply the travel time 230 by the weather factor 240 to determine the projected drive time 232. The generator module 504 can aggregate the projected drive time 232 for each instances of the route segment 342 representing the candidate route 260 to determine the projected drive time 232 for the candidate route 260. The generator module 504 can compare the projected drive time 232 between each instances of the candidate route 260. The generator module 504 can select the instance of the candidate route 260 having the shortest projected instance of the drive time 232 as the drive route 262.

For a specific example, the generator module 504 can generate two instances of the candidate route 260 between the start point 264 and the destination 268. The generator module 504 can retrieve the travel time 230 of 1.0 hour and 0.5 hour for the route segment 342 representing the first instance of the candidate route 260. In the same example, the generator module 504 can retrieve the weather factor 240 of 2.0. Based on the retrieved value of the travel time 230 and the weather factor 240, the generator module 504 can calculate the projected drive time 232 of 3.0 hours.

The generator module 504 can retrieve the travel time 230 of 0.75 hour and 3 hour for the second instance of the candidate route 260. The generator module 504 can retrieve the weather factor 240 of 1.0 for the route segment 342 representing the second instance of the candidate route 260. Using the travel time 230 and the weather factor 240, the generator module 504 can calculate the projected drive time 232 of 3.75 for the second instance of the candidate route 260.

The generator module 504 can compare the projected drive time 232 between the first instance of the candidate route 260 and the second instance of the candidate route 260. Because the projected drive time 232 of the first instance of the candidate route 260 is 0.75 hours less than the second instance of the candidate route 26, the generator module 504 can select the first instance of the candidate route 260 as the drive route 262.

The generator module 504 can generate the extended field 370 based on the navigation information 202, the status information 290, or a combination thereof. For example, the generator module 504 can generate the extended field 370 based on the drive route 262, the route history 340, the bandwidth level 350, the latency level 354, the reliability level 358, or a combination thereof.

For example, the generator module 504 can generate the extended field 370 based on the geographic area inside the perimeter generated by the pre-determined range 372 of FIG. 3 from the drive route 262. For a specific example, the generator module 504 can retrieve the pre-determined range 372 from the first storage unit 414, the second storage unit 446, or a combination thereof. If the pre-determined range 372 is 1 mile and the drive route 262 is 10 miles in a straight line, the generator module 504 can generate the extended field 370 surrounding the drive route 262 of 23.14 square miles.

It has been discovered that the navigation system 100 generating the extended field 370 based on the pre-determined range 372 improves the efficiency in retrieving information useful to the user of the navigation system 100. More specifically, the navigation system 100 can retrieve information specific to the geographic area within the pre-determined range 372 of the potential route 368. As a result, the navigation system 100 can improve the efficiency, safety, or a combination thereof of the operation of the navigation system 100, the vehicle, or a combination thereof by reallocating the resources available.

The generator module 504 can also generate the extended field 370 based on the route history 340. More specifically, the generator module 504 can generate the extended field 370 for the geographic area within the pre-determined range 372 of the often traveled instance of the route segment 342. For example, the generator module can determine the often traveled instance of the route segment 342 based on the route segment 342 meeting or exceeding the history threshold 348 of FIG. 3.

It has been discovered that the navigation system 100 generating the extended field 370 based on the route history 340 improves the efficiency of updating the first map tile 374. By generating the extended field 370 based on the route history 340, the navigation system 100 can determine the first map tile 374 including the path 212 in which the user have a tendency to return. As a result, the navigation system 100 can improve the efficiency, safety, or a combination thereof of the operation of the navigation system 100, the vehicle, or a combination thereof by reallocating the resources available.

For example, the generator module 504 can retrieve the history threshold 348 from the first storage unit 414, the second storage unit 446, or a combination thereof. In another example, the generator module 504 can calculate the frequency of driving the route segment 342 based on the route history 340. The generator module 504 can calculate the frequency of driving the route segment 342 by dividing the number of times the route segment 342 was driven in the past by the range of the dates covered in the route history 340. The generator module 504 can generate the extended field 370 within the pre-determined range 372 of the route segment 342 if the frequency of driving the instance of the route segment 342 is greater than the history threshold 348.

In a specific example, the generator module 504 can calculate the frequency of driving the route segment 342 as 10 occasions per month based on the route history 340. In this example, the generator module 504 can retrieve the history threshold 348 of 8 occasions in a previous month. Continuing in this example, the generator module 504 can retrieve the pre-determined range 372 of 1 mile. The generator module 504 can compare the frequency of driving the instance of the route segment 342 based on the route history 340 and the frequency of driving representing the history threshold 348.

Since the history threshold 348 is less than the frequency of driving the route segment 342 based on the route history 340, the generator module 504 can generate the extended field 370 surrounding the instance of the route segment 342. If the route segment 342 in this example has the length of 5.0 miles in a straight line, the generator module 504 can generate the extended field 370 of 13.14 square miles surrounding the instance of the route segment 342.

The generator module 504 can also increase the extended field 370 by multiplying the pre-determined range 372 with the multiplier factor based on value of the bandwidth level 350. For a specific example, the multiplier factor based on the bandwidth level 350 of low value can be less than the multiplier factor based on the bandwidth level 350 of medium value. In another specific example, the multiplier factor based on the bandwidth level 350 of medium value can be less than the multiplier factor based on the bandwidth level 350 of high value.

It has been discovered that the navigation system 100 increasing the extended field 370 by multiplying the pre-determined range 372 with the multiplier factor improves the efficiency of updating the first map tile 374. More specifically, by multiplying the pre-determined range 372 with the multiplier factor based on the value of the bandwidth level 350, the navigation system 100 can determine the instances of the map tile 382 requiring the update. As a result, the navigation system 100 can improve the efficiency, safety, or a combination thereof of the operation of the navigation system 100, the vehicle, or a combination thereof by reallocating the resources available.

For example, the generator module 504 multiplying the pre-determined range 372 by the multiplier factor based on the bandwidth level 350 of low can be below 0.8. In another specific example, the generator module 504 multiplying the pre-determined range 372 by the multiplier factor based on the bandwidth level 350 of medium can be 0.8. In further example, the generator module 504 multiplying the pre-determined range 372 by the multiplier factor based on the bandwidth level 350 of high can be above 0.8.

The generator module 504 can also increase the extended field 370 by multiplying the pre-determined range 372 with the multiplier factor based on the value of the latency level 354. For a specific example, the multiplier factor based on the latency level 354 of high value can be lesser than the multiplier factor based on the latency level 354 of medium value. In another specific example, the multiplier factor based on the latency level 354 of medium value can be lesser than the multiplier factor based on the latency level 354 of low value.

For specific example, the generator module 504 multiplying the pre-determined range 372 by the multiplier factor based on the latency level 354 of high value can be lesser than 0.8. The generator module 504 further multiplying the pre-determined range 372 by the multiplier factor based on the latency level 354 of medium value can be 0.8. In another example, the generator module 504 multiplying the pre-determined range 372 based on the latency level 354 of low value can be greater than 0.8.

In a different example, the generator module 504 can also increase the extended field 370 by multiplying the pre-determined range 372 with the multiplier factor based on the reliability level 358. For example, the multiplier factor based on the reliability level 358 of high value can be greater than the multiplier factor based on the reliability level 358 of medium value. In another example, the multiplier factor based on the reliability level 358 of medium value can be greater than the multiplier factor based on the reliability level 358 of low value.

For example, the generator module 504 can multiply the pre-determined range 372 by the multiplier factor representing a value greater than 3 if the reliability level 358 is high value. In another example, the generator module 504 can multiply the pre-determined range 372 by the multiplier factor representing 3 if the reliability level 358 is medium value. In a further example, the generator module 504 can multiply the pre-determined range 372 by the multiplier factor representing a value lower than 3 if the reliability level 358 is low value.

The generator module 504 can also generate the extended field 370 in a number of other ways. For example, the generator module 504 can generate the extended field 370 based on the current location 302, the velocity 310, the current direction 330, or a combination thereof.

For example, the generator module 504 can generate the extended field 370 based on the area inside the pre-determined range 372 from where the current location 302 is located. In a specific example, the generator module 504 can generate the extended field 370 for the area covered inside the pre-determined range 372 of 5 miles from the current location 302. In this example, the generator module 504 can generate the extended field 370 of 78.5 square miles with a shape of the circle.

Alternatively, the generator module 504 can also generate the extended field 370 not limited to a fixed distance of the pre-determined range 372. In this example, the extended field 370 can be generated in the shape of a polygon, an amorphous shape, a triangle, or a combination thereof. In another example, the generator module 504 can generate the extended field 370 based on the different types of the velocity 310. In this example, the generator module 504 can generate the extended field 370 covering the area within the pre-determined range 372 from the temporary line segment 304 of FIG. 3. The generator module 504 can generate the temporary line segment 304 based on the current location 302 and the direction of travel.

For example, if the first device 102 is traveling east, the generator module 504 can generate the temporary line segment 304 from the current location 302 extending toward the eastern direction for the distance determined by the navigation system 100.

The generator module 504 in this example can generate the extended field 370 having a shape of the ellipse. Alternatively, the generator module 504 can also generate the extended field 370 not limited to a fixed distance of the pre-determined range 372. In this example, the extended field 370 can also be generated in the shape of a polygon, an amorphous shape, a triangle, or a combination thereof.

It has been discovered that the navigation system 100 generating the extended field 370 based on the velocity 310 improves the efficiency in updating the map tile 382. More specifically, by generating the extended field 370 based on the velocity 310, the navigation system 100 can determine the map tile 382 representing the geographical area where the user of the navigation system 100 is heading. As a result, the navigation system 100 can improve the efficiency, safety, or a combination thereof of the operation of the navigation system 100, the vehicle, or a combination thereof by reallocating the resources available.

For a specific example, the generator module 504 can generate an instance of the extended field 370 based on the immediate velocity 312. A finite value used to illustrate the length of the temporary line segment 304 is exemplary and can be replaced by other values for the given context. In a specific example, the generator module 504 can generate the temporary line segment 304 with the length of 5 miles in the direction of the immediate velocity 312. The generator module 504 can generate the extended field 370 within the pre-determined range 372 of 2 miles from the temporary line segment 304. The generator module 504 in this example can generate the extended field 370 having a shape of the ellipse with the area of 32.6 square miles.

In another specific example, the generator module 504 can generate the instance of the extended field 370 based on the short-term velocity 314. In this specific example, the generator module 504 can generate the temporary line segment 304 with the length of 10 miles in the direction of the short-term velocity 314. The generator module 504 can generate the extended field 370 within the pre-determined range 372 of 1 mile from the temporary line segment 304. The generator module 504 in this example can generate the extended field 370 having a shape of the ellipse with the area of 23.1 square miles.

In a further specific example, the generator module 504 can generate an instance of the extended field 370 based on the long-term velocity 316. In this specific example, the generator module 504 can generate the temporary line segment 304 with the length of 40 miles in the direction of the long-term velocity 316. The generator module 504 in this example can generate the extended field 370 within the pre-determined range 372 of 0.5 miles from the temporary line segment 304. The generator module 504 in this example can generate the extended field 370 having a shape of the ellipse with the area of 40.8 square miles.

For another example, the generator module 504 can generate an instance of the extended field 370 in the direction of the current direction 330. In this example, the generator module 504 can generate the temporary line segment 304 with the length of 10 miles drawn in the direction of the current direction 330. The generator module in this example can generate the extended field 370 within the pre-determined range 372 of 2.5 from the temporary line segment 304. The generator module 504 in this example can generate the extended field 370 with the shape of the ellipse with the area of 69.6 square miles.

The generator module 504 can parse the multiple instance of the extended field 370 based on the velocity 310, the current direction, 330, or a combination thereof. The generator module 504 can also aggregate the multiple instances of the route segment 342 existing inside the parsed instance of the extended field 370 and the drive route 262 to determine the potential route 368 of FIG. 3. The generator module 504 can communicate the navigation information 202, the status information 290, the potential route 368, or a combination thereof to a partition module 506.

The navigation system 100 can include the partition module 506, which can couple to the generator module 504. The partition module 506 partitions the map 380 into multiple instances of the map tile 382 of FIG. 3. For example, the partition module 506 can partition the map 380 into the map tile 382 having various sizes based on the navigation information 202, the status information 290, or a combination thereof. For a specific example, the partition module 506 can partition the map 380 into a plurality of the map tile 382 based on the bandwidth level 350, the latency level 354, the reliability level 358, the bandwidth limit 362, or a combination thereof.

It has been discovered that the navigation system 100 partitioning the map 380 into the map tile 382 based on the navigation information 202, the status information 290, or combination thereof improves the efficiency of updating the map tile 382. More specifically, the navigation system 100 can partition the map 380 into different sized instances of the map tile 382 based on the bandwidth level 358, the latency level 354, the reliability level 358, the bandwidth limit 362, or a combination thereof. As a result, the navigation system 100 can improve the efficiency of the operation of the navigation system 100, the vehicle, or a combination thereof for reallocating the resources available.

For example, the partition module 506 can partition the map 380 into a small sized instance of the tile size 383 of the map tile 382 if the bandwidth level 350 is low value, the latency level 354 is high value, the reliability level 358 is low value, the bandwidth limit 362 is "limit reached," or a combination thereof. In another example, the partition module 506 can partition the map 380 into a medium sized instance of the tile size 383 of the map tile 382 if the bandwidth level 350 is medium value, the latency level 354 is medium value, the instance of the reliability level 358 is medium value, or a combination thereof. The small sized instance of the map tile 382 can have a smaller latitudinal and longitudinal dimension compared to the medium sized instance of the map tile 382.

In a further example, the partition module 506 can partition the map 380 into large sized instance of the tile size 383 of the map tile 382 if the bandwidth level 350 is high value, the instance of the latency level 354 is low value, the instance of the reliability level 358 is high value, the bandwidth limit 362 is "limit not reached," or a combination thereof. The large sized instance of the map tile 382 can have a greater longitudinal and latitudinal dimension than the medium sized instance of the map tile 382.

For example, the partition module 506 can partition the map 380 covering the geographical area inside the dimension of 300 miles by 300 miles into the small sized instances of the map tile 382. The small sized instance of the map tile 382 can have the dimension of 0.1 mile by 0.1 mile. In this example, the partition module 506 can partition the map 380 into 3000 latitudinal by 3000 longitudinal instances of the map tile 382, totaling 9,000,000 instances of the map tile 382. In this example, the partition module 506 can divide the map 380 by 2999 equally spaced instances of the map divider grid 388 of FIG. 3 in the latitudinal direction. Continuing in the same example, the partition module 506 can divide the map 380 by 2999 equally spaced instances of the map divider grid 388 in the longitudinal direction.

For example, the partition module 506 can determine the tile size 383 of the map tile 382 based on the measurement of the geographical area of the map 380 partitioned. For a specific example, the partition module 506 can determine the tile size 383 of the square shaped instance of the map tile 382 partitioned by the map divider grid 388 by measuring the height and the width of the map tile 382. In this example, the tile size 382 can be represented by an absolute length unit such as meters and feet, the relative length units such as pixels, or a combination thereof.

In another example, the partition module 506 can partition the map 380 covering the geographical area inside the dimension of 300 miles by 300 miles into the medium sized instance of the map tile 382. The medium sized instance of the map tile 382 can have the dimension of 3 miles by 3 miles. In this example, the partition module 506 can partition the map 380 into 100 latitudinal by 100 longitudinal instances of the map tile 382, totaling 10,000 instances of the map tile 382. For example, the partition module 506 can divide the map 380 by 99 equally spaced instances of the map divider grid 388 in the latitudinal direction. Continuing in the same example, the partition module 506 can divide the map 380 by 99 equally spaced instances of the map divider grid 388 in the longitudinal direction.

In a further example, the partition module 506 can partition the map 380 covering the geographical area inside the dimension of 300 miles by 300 miles into the large sized instance of the map tile 382. The large sized instance of the map tile 382 can have the dimension of 30 miles by 30 miles. In this example, the partition module 506 can partition the map 380 into 10 latitudinal by 10 longitudinal instances of the map tile 382. For example, the map 380 can be partitioned using 9 equally spaced instances of the map divider grid 388 in the latitudinal direction. Continuing in the same example, the partition module 506 can divide the map 380 by 9 equally spaced instances of the map divider grid 388 in the longitudinal direction.

The partition module 506 can assign the tile identification 384 of FIG. 3 to the partitioned instance of the map tile 382. For example, the partition module 506 can include the location information in the tile identification 384 based on the position from the base point 386 of FIG. 3.

For a specific example, the partition module 506 can partition the map 380 into large sized instance of the map tile 382. In this example, the base point 386 of the map 380 can be located at the physical location 250 in the south-west corner, at the location (0, 0) denoted by a black circle of FIG. 3. Each instance of the map tile 382 can be assigned the location using the two-grid Cartesian coordinate system by the partition module 506. For example, the partition module 506 can assign the tile identification 384 of (X0, Y9) to the northwestern instance of the map tile 382. In another example, the partition module 506 can assign the tile identification 384 of (X9, Y9) to the northeastern instance of the map tile 382. For another example, the partition module 506 can assign the tile identification 384 of (X9, Y0) to the southeastern instance of the map tile 382.

The partition module 506 can communicate the map 380, the map tile 382, the map divider grid 388, or a combination thereof to a comparer module 508. The partition module 506 can also communicate the potential route 368 to the comparer module 508.

The navigation system 100 can include the comparer module 508, which can couple to the partition module 506. The comparer module 508 determines the update priority 390 of FIG. 3 of the map tile 382. The comparer module 508 can determine the update priority 390 of the map tile 382 in a various way. For example, the comparer module 508 can determine the update priority 390 of the map tile 382 based on identifying the discrepancy 392 in the map information 216 between multiple instances of the map tile 382. For a specific example, the comparer module 508 can overlay the generated instance of the drive route 262, the generated instance of the extended field 370, or a combination thereof over the map tile 382 in the first map 394 for comparison to identify the discrepancy 392.

In another specific example, the comparer module 508 can determine the update priority 390 of the map tile 382 based on identifying the discrepancy 392 in the map information 216 between the first map tile 374 and the second map tile 376. In this example, the comparer module 508 can determine the update priority 390 of the map tile 382 based on the discrepancy 392 between the first map information 322 of the first map 394 and the second map information 324 of the second map 396. For example, the comparer module 508 can overlay the generated instance of the drive route 262, the generated instance of the extended field 370, or a combination thereof over the first map tile 374. The comparer module 508 can identify the discrepancy 392 based on the difference between the first map information 322 of the first map 394 and the second map information 324 of the drive route 262, the generated instance of the extended field 370, or a combination thereof of the second map 396.

It has been discovered that the navigation system 100 determining the update priority 390 to update the map tile 382 based on comparing the first map 394 and the second map 396 improves the efficiency of updating the map tile 382. More specifically, the navigation system 100 can determine the update priority 390 of the map tile 382 by overlaying the potential route 368 on the first map 394 to identify the discrepancy 392. As a result, the navigation system 100 can improve the efficiency, the safety, or a combination thereof of operating the navigation system 100, the vehicle, or a combination thereof for by reallocating the resources available.

In one example, the comparer module 508 can compare the path 212 representing the first map information 322 of the map tile 382 of the first map 394 to the path 212 representing the potential route 368 to determine the discrepancy 392. In this example, the comparer module 508 can determine the update priority 390 of the map tile 382 as "high" if the discrepancy 392 between the map tile 382 of the first map 394 and the map tile 382 of the potential route 368 is the drive route 262 missing in the map tile 382 of the first map 394.

In another example, the comparer module 508 can determine the update priority 390 of the map tile 382 as "low." In this example, the path 212 representing the drive route 262 can be found in both the first map 394 and the potential route 368. Continuing in this example, however, the discrepancy 392 can exist between the first map tile 374 of the first map 394 and the second map tile 376 of the potential route 368 where the path 212 representing the extended field 370 can be missing in the first map 394.

For another example, the comparer module 508 can identify the update priority 390 of the map tile 382 as "update not required." In this example, all instances of the path 212 comprising the drive route 262 and the extended field 370 in the first map tile 374 of the first map 394 and the second map tile 376 of the potential route 368 can be matched.

In a specific example, the comparer module 508 can overlay the drive route 262 and the extended field 370 over the first map 394 in the first device 102. In this example, certain instance of the first map tile 374 can be overlaid by the drive route 262 and the extended field 370. For example, the instance of the first map tile 374 overlaid by the drive route 262 and the extended field 370 can include the map tile 382 identified as (X3, Y3), (X3, Y4), (X3, Y5), and (X4, Y5).

For each instance of the map tile 382, the comparer module 508 can compare the path 212 comprising the drive route 262 to the path 212 included in the map tile 382. The comparer module 508 can also compare the path 212 included in the extended field 370 to the path 212 included in the map tile 382. In this specific example, the comparer module 508 cannot confirm the path 212 included in the map tile 382 identified as (X3, Y3) and (X4, Y5) to match the path 212 representing the drive route 262. In this example, the comparer module 508 can identify the update priority 390 of the instance of the map tile 382 identified as (X3, Y3) and (X4, Y5) as "high."

In another example, the comparer module 508 can confirm the presence of the path 212 included in the first map tile 374 identified as (X3, Y4) matching the path 212 representing the drive route 262. However, in this example, the comparer module 508 cannot confirm path 212 included in the extended field 370 to match the path included in the map tile 382. In this example, the comparer module 508 can identify the update priority 390 of the instance of the map tile 382 identified as (X3, Y4) as "low."

In a different example, for the map tile 382 identified as (X3, Y5), the comparer module 508 can confirm the presence of the path 212 representing both the drive route 262 and the path 212 inside the extended field 370. In this example, the comparer module 508 can identify the update priority 390 of the instance of the map tile 382 identified as (X3, Y5) as "update not required." The comparer module 508 can communicate the update priority 390 for each instance of the map tile 382 to an updater module 510.

The navigation system 100 can include the updater module 510, which can couple to the comparer module 508. The updater module 510 updates the old version of the map tile 382 with the newer version of the map tile 382. For example, the updater module 510 can update the old version of the map tile 382 stored in the first device 102 with the newer version of the map tile 382 stored in the second device 106. The updater module 510 can also partition the map 380 stored in the second device 106 in the same pattern as the map tile 382 partitioned by the partition module 506.

In a different example, the updater module 510 can store the map information 216 representing the discrepancy 392 between the second map tile 376 and the first map tile 374 in the first device 102. The updater module 510 can store the map information 216 representing the discrepancy between the two instances of the map tile 382 in various ways.

For example, the updater module 510 can retrieve the previously determined instance of the update priority 390 for each instances of the map tile 382. The updater module 510 can store the second map information 324 representing the discrepancy 392 into the first device 102 based on the update priority 390. For example, the updater module 510 can store the second map tile 376 in the first storage unit 414 if the update priority 390 of the second map tile 376 is "high." In the same example, following the storing of the second map tile 376 with the update priority 390 of "high" into the first storage unit 414, the updater module 510 can store the second map tile 376 with the update priority 390 of "low" into the first storage unit 414.

It has been discovered that the navigation system 100 storing the second map tile 376 from the second device 106 into the first storage unit 414 based on the update priority 390 improves the efficiency of storing the map 380. More specifically, the navigation system 100 can store the second map tile 376 with "high" instance of the update priority 390 to the first storage unit 414 prior to the second map tile 376 with "low" instance of the update priority 390. As a result, the navigation system 100 can improve the efficiency, the safety, or a combination thereof of operating the navigation system 100, the vehicle, or a combination thereof by reallocating the resources available.

The updater module 510 can update the map tile 382 stored in the first storage unit 414 with the map tile 382 stored in the second device 446 in various ways. For example, the updater module 510 can update the map tile 382 based on the update priority 390.

In an example, the updater module 510 can update the instances of the map tile 382 identified with the update priority 390 of "high" prior to the map tile 382 identified as "low." In this example, the updater module 510 can update the map tile 382 stored in the first storage unit 414 with the corresponding instance of the map tile 382 stored in the second storage unit 446.

The corresponding instance of the map tile 382 can be referred to as the map tile 382 covering the same geographic area. The updater module 510 can also update the instances of the map tile 382 displayed on the first device 102 identified with the update priority 390 of "low," prior to the instance of the map tile 382 identified as "update not required."

In a different example, the updater module 510 can update the first map information 322 for displaying the drive route 262 on the first device 102. In this example, the updater module 510 can update the first map 394 based on the discrepancy 392 between the first map information 322 of the first map 394 and the second map information 324 of the second map 396. If the discrepancy 392 includes the second map information 324 required for the displaying the drive route 262, the updater module 510 can update the first map information 322. For example, the updater module 510 can update the first map information 322 by copying the corresponding missing instance of the second map information 324 to the first storage unit 414.

It has been discovered that the navigation system 100 updating the first map 394 based on the discrepancy 392 between the first map 394 and the second map 396 improves the efficiency of updating the first map 394. More specifically, the navigation system 100 can update the discrepancy 392 between the first map 394 and the second map 396 by adding the second map information 324 of the potential route 368 missing from the first map 394 to the first map 394. As a result, the navigation system 100 can improve the efficiency, the safety, or a combination thereof of operating the navigation system 100, the vehicle, or a combination thereof for by reallocating the resources available.

The physical transformation from moving from the start point 264 to the destination 268 results in the movement in the physical world, such as people using the first device 102, the vehicle, or a combination thereof, based on the operation of the navigation system 100. As the movement in the physical world occurs, the movement itself creates additional information that is converted back into determining the update priority 390, the map tile 382, the potential route 368, or a combination thereof for the continued operation of the navigation system 100 and to continue the movement in the physical world.

The first software 426 of FIG. 4 of the first device 102 can include the modules for the navigation system 100. For example, the first software 426 can include the configuration module 502, the generator module 504, the partition module 506, the comparer module 508, and the updater module 510.

The first control unit 412 of FIG. 4 can execute the first software 426 for the configuration module 502 to obtain the navigation information 202, determine the status information 290, or a combination thereof. The first control unit 412 can execute the first software 426 for the generator module 504 to generate the drive route 262, the extended field 370, or a combination thereof. The first control unit 412 can execute the first software 426 for the partition module 506 to partition the map 380.

The first control unit 412 can execute the first software 426 for the comparer module 530 to determine the update priority 390. The first control unit 412 can execute the first software 426 to determine the discrepancy 392. The first control unit 412 can execute the first software 426 for the updater module 530 to update the map tile 382.

The second software 442 of FIG. 4 of the second device 106 of FIG. 4 can include the modules for the navigation system 100. For example, the second software 442 can include the configuration module 502, the generator module 504, the partition module 506, the comparer module 508, and the updater module 510.

The second control unit 434 of FIG. 4 can execute the second software 442 for the configuration module 502 to obtain the navigation information 202, determine the status information 290, or a combination thereof. The second control unit 434 can execute the second software 442 for the generator module 504 to generate the drive route 262, the extended field 370, the potential route 368, or a combination thereof. The second control unit 434 can execute the second software 442 for the partition module 506 to partition the map 380.

The second control unit 434 can execute the second software 442 for the comparer module 530 to determine the update priority 390. The second control unit 434 can execute the second software 442 for the updater module 530 to update the map tile 382.

The modules of the navigation system 100 can be partitioned between the first software 426 and the second software 442. The second software 442 can include the generator module 504 and the updater module 510. The second control unit 434 can execute modules partitioned on the second software 442 as previously described.

The first software 426 can include the configuration module 502, the partition module 506, and the comparer module 508. Based on the size of the first storage unit 414, the first software 426 can include additional modules of the navigation system 100. The first control unit 412 can execute the modules partitioned on the first software 426 as previously described.

The first control unit 412 can operate the first communication interface 428 of FIG. 4 to communicate the navigation information 202, the status information 290, the drive route 262, the extended field 370, the map 380, the map tile 382, the discrepancy 392, the update priority 390, or a combination thereof to or from the second device 106. The first control unit 412 can operate the first software 426 to operate the location unit 420 of FIG. 4. The second control unit 434 can operate the second communication interface 450 of FIG. 4 to communicate the navigation information 202, the status information 290, the drive route 262, the extended field 370, the map 380, the map tile 382, the update priority 390, or a combination thereof to or from the first device 102 through the communication path 104 of FIG. 4.

The navigation system 100 describes the module functions or order as an example. The modules can be partitioned differently. For example, the configuration module 502 and the generator module 504 can be combined. Each of the modules can operate individually and independently of the other modules. Furthermore, data generated in one module can be used by another module without being directly coupled to each other. For example, the updater module 510 can receive the navigation information 202 and the status information 290 from the configuration module 502. Further, "communicating" can represent sending, receiving, or a combination thereof the data generated to or from one to another.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first control unit 412, the second control unit 434, or a combination thereof can collectively refer to all hardware accelerators for the modules.

The modules described in this application can be implemented as instructions stored on a non-transitory computer readable medium to be executed by the first control unit 412, the second control unit 434, or a combination thereof. The non-transitory computer medium can include the first storage unit 414, the second storage unit 446, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 6:
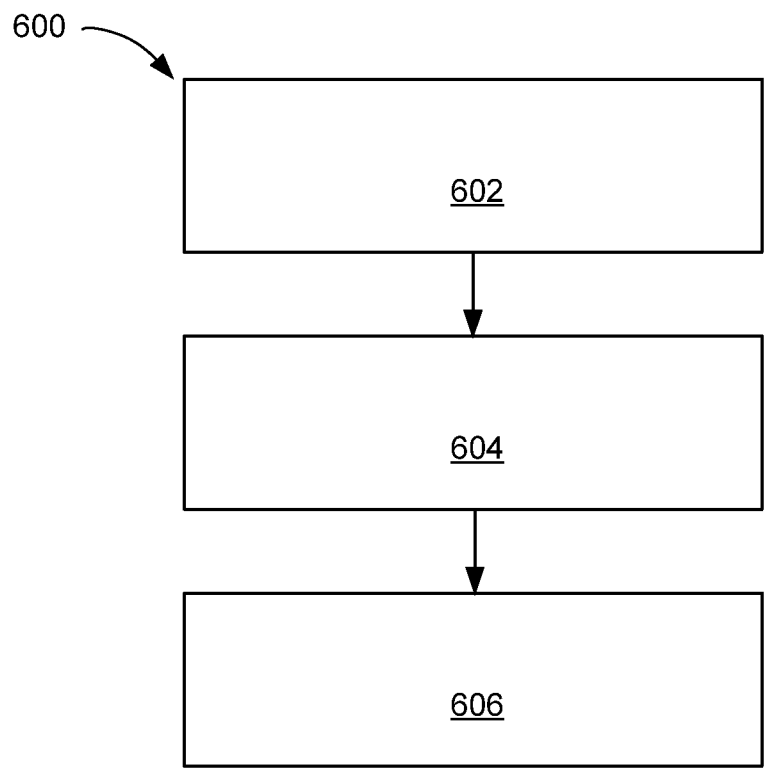
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: generating a potential route based on the navigation information, a status information, or a combination thereof in a block 602; determining an update priority based on comparing a first map and the potential route on a second map with a control unit for identifying a discrepancy between the first map and the second map in a block 604; and updating the first map based on the update priority for displaying on a device on block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
generating an extended field for increasing a probability to display a geographical area relative to the geographic area outside of the extended field;
generating a potential route within the extended field based on a navigation information, a status information, or a combination thereof;
determining an update priority representing an order to update map tiles based on comparing a first map and the potential route on a second map with a control unit for identifying a discrepancy between the first map and the second map; and
updating the first map based on the update priority for displaying on a device.

2. The method as claimed in claim 1 wherein determining the update priority includes determining the update priority based on comparing a path of a first map tile of the first map and the potential route of a second map tile of the second map for identifying the discrepancy between the first map tile and the second map tile.

3. The method as claimed in claim 1 wherein determining the update priority includes determining the update priority based on comparing a first map information of the first map and a second map information of the potential route of the second map for identifying the discrepancy between the first map information and the second map information.

4. The method as claimed in claim 1 wherein generating the potential route includes generating the potential route based on a route history for comparing the potential route and the first map to identify the discrepancy.

5. The method as claimed in claim 1 wherein updating the first map includes updating the first map based on a second map information representing the discrepancy between the first map and the potential route of the second map for displaying on the device.

6. The method as claimed in claim 1 wherein updating the first map includes:
   determining a second map information representing the discrepancy between the first map and the potential route;
   storing the second map information in a storage unit based on the update priority for displaying on the device.

7. The method as claimed in claim 1 wherein generating the potential route includes generating the potential route based on a velocity meeting or exceeding a velocity threshold for comparing the potential route and the first map to identify the discrepancy.

8. The method as claimed in claim 1 wherein generating the potential route includes selecting a drive route from a candidate route based on a live information of a path for comparing the potential route and the first map to identify the discrepancy.

9. The method as claimed in claim 1 further comprising:
   determining a bandwidth based on a data packet communicated by a communication unit during a measuring duration;
   determining a bandwidth level based on the bandwidth meeting or exceeding a bandwidth level threshold to identify the discrepancy; and
   determining a tile size based on the bandwidth level for partitioning the first map.

10. The method as claimed in claim 1 further comprising determining a tile size of a first map tile of the first map, a second map tile of the second map, or a combination thereof, based on a reliability level meeting or exceeding a reliability threshold.

11. A navigation system comprising:
   a control unit for;
      generating an extended field for increasing a probability to display a geographical area relative to the geographic area outside of the extended field;
      generating a potential route within the extended field based on a navigation information, a status information, or a combination thereof,
      determining an update priority representing an order to update map tiles based on comparing a first map and the potential route on a second map for identifying a discrepancy between the first map and the second map,
      updating the first map based on the update priority, and
   a communication interface, coupled to the control unit, for communicating the first map for displaying on a device.

12. The system as claimed in claim 11 wherein the control unit is for determining the update priority based on comparing a path of a first map tile of the first map and the potential route of a second map tile of the second map for identifying the discrepancy between the first map tile and the second map tile.

13. The system as claimed in claim 11 wherein the control unit is for determining the update priority based on comparing a first map information of the first map and a second map information of the potential route of the second map for identifying the discrepancy between the first map information and the second map information.

14. The system as claimed in claim 11 wherein the control unit is for generating the potential route based on a route history for comparing the potential route and the first map to identify the discrepancy.

15. The system as claimed in claim 11 wherein the control unit is for updating the first map includes updating the first map based on a second map information representing the discrepancy between the first map and the potential route of the second map for displaying on the device.

16. A non-transitory computer readable medium including instructions for execution, the instructions comprising:
   generating an extended field for increasing a probability to display a geographical area relative to the geographic area outside of the extended field;
   generating a potential route within the extended field based on a navigation information, a status information, or a combination thereof;
   determining an update priority representing an order to update map tiles based on comparing a first map and the potential route on a second map for identifying a discrepancy between the first map and the second map; and
   updating the first map based on the update priority for displaying on a device.

17. The non-transitory computer readable medium as claimed in claim 16 wherein determining the update priority includes determining the update priority based on comparing a path of a first map tile of the first map and the potential route of a second map tile of the second map for identifying the discrepancy between the first map tile and the second map tile.

18. The non-transitory computer readable medium as claimed in claim 16 wherein determining the update priority includes determining the update priority based on comparing a first map information of the first map and a second map information of the potential route of the second map for identifying the discrepancy between the first map information and the second map information.

19. The non-transitory computer readable medium as claimed in claim 16 wherein generating the potential route includes generating the potential route based on a route history for comparing the potential route and the first map to identify the discrepancy.

20. The non-transitory computer readable medium as claimed in claim 16 wherein updating the first map includes updating the first map based on a second map information representing the discrepancy between the first map and the potential route of the second map for displaying on the device.

* * * * *